(12) United States Patent
Turvey et al.

(10) Patent No.: US 12,178,266 B2
(45) Date of Patent: Dec. 31, 2024

(54) IMPACT RESISTANT GARMENT

(71) Applicant: Design Blue Limited, London (GB)

(72) Inventors: Adam Turvey, London (GB); Richard Holman, London (GB); Thomas Pearson, London (GB)

(73) Assignee: Design Blue Limited, London (GB)

( * ) Notice: Subject to any disclaimer, the term of this patent is extended or adjusted under 35 U.S.C. 154(b) by 127 days.

(21) Appl. No.: 17/787,408

(22) PCT Filed: Dec. 21, 2020

(86) PCT No.: PCT/GB2020/053335
§ 371 (c)(1),
(2) Date: Jun. 20, 2022

(87) PCT Pub. No.: WO2021/123841
PCT Pub. Date: Jun. 24, 2021

(65) Prior Publication Data
US 2023/0145775 A1 May 11, 2023

(30) Foreign Application Priority Data
Dec. 20, 2019 (GB) ...................................... 1919094

(51) Int. Cl.
*B29C 43/18* (2006.01)
*A41D 19/015* (2006.01)
(Continued)

(52) U.S. Cl.
CPC ...... *A41D 19/01523* (2013.01); *B29C 43/003* (2013.01); *B29C 43/18* (2013.01);
(Continued)

(58) Field of Classification Search
CPC .............. B29C 2043/025; B29C 41/20; B29C 44/5627; B29C 44/027; B29C 44/025;
(Continued)

(56) References Cited

U.S. PATENT DOCUMENTS 3,932,252 A * 1/1976 Woods ................ B29C 44/1261
156/289
4,130,614 A * 12/1978 Saidla ................... B29C 70/086
264/46.7
(Continued)

FOREIGN PATENT DOCUMENTS

EP 2204395 A1 7/2010
JP H06826 * 6/1992 ........... B29C 43/021
(Continued)

OTHER PUBLICATIONS

English translation of JPH06826 to Nakanishi Motoyasu, (1992). (Year: 1992).*
(Continued)

*Primary Examiner* — Matthew J Daniels
(74) *Attorney, Agent, or Firm* — Ryan T. Grace; Advent, LLP

(57) ABSTRACT

An impact resistant textile-supported garment, or component thereof, comprises a fabric layer, and (i) at least five non-interconnected impact resistant polyurethane segments upon an outer surface of the fabric layer, wherein at least two of the non-interconnected impact resistant polyurethane segments has a depth of at least 3 mm, preferably at least 4 mm, and wherein at least five of the plurality of non-interconnected segments have dimensions smaller than 1.75 cm×1 cm×1 cm; or (ii) at least one non-interconnected impact resistant polyurethane segment, wherein the at least one segment has a depth of at least 3 mm at its deepest part, and wherein the at least one segment is a hollow segment comprising one or more regions defined by an outer polyurethane perimeter, surrounding a region of fabric that is not covered by polyurethane.

24 Claims, 14 Drawing Sheets

(51) Int. Cl.
  *B29C 43/00* (2006.01)
  *B32B 5/02* (2006.01)
  *B32B 27/12* (2006.01)
  *B32B 27/40* (2006.01)
  *C08G 18/08* (2006.01)
  *C08G 18/10* (2006.01)
  *C08G 18/16* (2006.01)
  *C08G 18/20* (2006.01)
  *C08G 18/22* (2006.01)
  *C08G 18/32* (2006.01)
  *C08G 18/48* (2006.01)
  *C08G 18/76* (2006.01)
  *B29C 43/56* (2006.01)
  *B29K 75/00* (2006.01)
  *B29L 31/48* (2006.01)

(52) U.S. Cl.
  CPC .............. *B32B 5/024* (2013.01); *B32B 27/12* (2013.01); *B32B 27/40* (2013.01); *C08G 18/0857* (2013.01); *C08G 18/0885* (2013.01); *C08G 18/10* (2013.01); *C08G 18/163* (2013.01); *C08G 18/2063* (2013.01); *C08G 18/222* (2013.01); *C08G 18/227* (2013.01); *C08G 18/3206* (2013.01); *C08G 18/4829* (2013.01); *C08G 18/4841* (2013.01); *C08G 18/7671* (2013.01); *B29C 2043/561* (2013.01); *B29K 2075/00* (2013.01); *B29K 2713/00* (2013.01); *B29L 2031/4864* (2013.01); *B32B 2250/02* (2013.01); *B32B 2437/02* (2013.01)

(58) Field of Classification Search
  CPC .... B29C 2043/3673; B29C 2043/3671; B29C 2043/187
  See application file for complete search history.

(56) References Cited

U.S. PATENT DOCUMENTS

| | | | | |
|---|---|---|---|---|
| 4,134,955 | A * | 1/1979 | Hanrahan, Jr. | A43B 1/04 425/129.2 |
| 4,377,609 | A * | 3/1983 | Bartoli | B29C 44/14 264/161 |
| 4,581,187 | A * | 4/1986 | Sullivan | A43B 7/28 264/153 |
| 4,921,672 | A * | 5/1990 | Bock | B29C 45/2701 264/161 |
| D321,426 | S * | 11/1991 | Brinker | D2/623 |
| 5,578,653 | A | 11/1996 | Hendreich et al. | |
| 9,555,567 | B2 * | 1/2017 | Gellis | A41D 19/01505 |
| 2003/0126666 | A1 * | 7/2003 | McNamara | A41D 19/01558 2/161.6 |
| 2005/0268374 | A1 * | 12/2005 | Mattesky | A41D 19/01582 2/164 |
| 2010/0024095 | A1 * | 2/2010 | Gellis | B29C 45/14 2/167 |
| 2014/0094534 | A1 | 4/2014 | Buckley et al. | |
| 2015/0128324 | A1 | 5/2015 | Baker et al. | |
| 2016/0029721 | A1 | 2/2016 | Sheehy et al. | |

FOREIGN PATENT DOCUMENTS

| | | |
|---|---|---|
| WO | 2008073267 A1 | 6/2008 |
| WO | 2017023799 A2 | 2/2017 |
| WO | 2020106376 A2 | 5/2020 |

OTHER PUBLICATIONS

Search Report for GB1919094.1, dated Nov. 27, 2023.
International Search Report for PCT/GB2020/053335, dated May 5, 2021.
Search Report under Section 17 for GB1919094.1, dated Jun. 11, 2020.
Sharmin, Eram et al., "Polyurethane: An Introduction." Chapter 1, INTECH Open Science—Open Minds, Aug. 29, 2012.

* cited by examiner

IMPACT RESISTANT GARMENT

FIELD OF THE INVENTION

The present invention relates to impact resistant textile-supported garments, or components thereof, and processes for their manufacture. The present invention also relates to a polyurethane composition for use in an impact resistant textile-supported garment, or component thereof, and a polyol composition and catalyst system for use in the manufacture of said polyurethane.

BACKGROUND OF THE INVENTION

Impact resistant garments are garments designed to be worn for safety in applications where it is anticipated that a wearer of said garment may be involved in a high impact collision. If the wearer of the garment is involved in a high impact event such as collision, the impact resistant garment absorbs the forces created by the impact and prevents the forces being transmitted to the body. Accordingly, impact resistant garments when worn may reduce injuries in subjects involved in high impact collisions. As such, high impact garments find utility in a wide variety of applications such as protective clothing for motorcyclists and workers in various industries. For example, lumberjacks and oil rig workers commonly wear protective clothing to protect them from possible impacts which could occur if they fell from a height. Players of various sports also require impact resistant clothing to protect them from anticipated impacts that may occur in the sport. For example, protective equipment for ice hockey players is an application for impact resistant clothing. Impact resistant clothing may also be worn by the military and law enforcement personnel.

A variety of materials may provide impact resistance. Of these materials, polymers such as polyurethanes are widely used. Polyurethane is a strong material that can provide sufficient resistance to impact by absorbing forces generated by a collision. Polyurethanes can provide these advantages whilst also providing some degree of flexibility and durability. Polyurethanes are alternating copolymers that are typically synthesized by reacting a polyol composition with an isocyanate such as a diisocyanate. FIG. 1 shows an example of a typical reaction for the synthesis of polyurethanes. In some applications a mixture of polyols can be reacted with isocyanates. The specific type of polyols used in a mixture, and the ratio of each polyol to other polyols present in the mixture may affect various physical properties of the polyurethane composition. Catalysts are typically used to induce the reaction of the polyols with the isocyanates so as to form the polyurethane composition (a process known as curing). Catalysts also typically affect the rate of curing. Heat is also typically used in the curing process. In a typical procedure for making a polyurethane article, a liquid polyol composition containing the polyol, catalyst and optionally other additives is mixed with a liquid isocyanate composition to form a liquid which is then introduced into a mold. Heat is then applied to the mold causing the composition to cure into a solid polyurethane article shaped in the shape of the mold.

Impact resistant textile-supported garments typically comprise a fabric garment that is to be worn adjacent to the skin of the wearer, such as a glove, with polyurethane upon the outer surface of the fabric to provide the impact resistance. The garment may optionally comprise additional layers. In addition to garments worn adjacent to the skin, textile-supported impact resistant apparel such as knee guards or body pads exist that can be worn over conventional clothing.

The level of impact resistance provided by the polyurethane (or other material used) is determined by a variety of factors. Firstly, it is necessary that a correct material that can provide sufficient impact resistance is used. For example, the specific polyurethane must have the correct combination of properties necessary to provide sufficient impact resistance. Next, the polyurethane (or other material) used must have a sufficient profile depth in order to provide impact resistance. By profile depth is meant the depth from the outer surface of the polyurethane layer to the bottom of the polyurethane layer which is in contact with the underlying fabric. For example, a profile depth of only 1 mm is unlikely to provide sufficient impact resistance for any polyurethane material because it will not sufficiently absorb the shocks generated by impact. Obviously, it is also desirable that a profile depth is not too large, since this would be cumbersome for the wearer. For example, a material that required 6 inches of profile depth to provide sufficient profile depth would be completely impractical. It has also been found that the specific geometries of components of the polyurethane layer affect the impact resistance of the impact resistant garment. Accordingly, certain geometries will be preferable over others.

FIG. 2 shows examples of impact resistant textile-supported gloves that are known in the art. It can be seen that these gloves comprise a fabric under layer with large impact resistant polyurethane segments upon the fabric layer. Such gloves are made by first molding each polyurethane component separately, before individually stitching each polyurethane component to the fabric under layer. The inventors of the present invention have appreciated that there are problems with such impact resistant gloves known in the art, and that are shown in FIG. 2. For example, the large segments on each finger reduce comfort, flexibility and dexterity of the wearer since the large segments resist finger movement such as finger bending. The large segments also do not provide sufficient breathability of the garments since a large area of the underlying textile is covered with polyurethane. The lack of breathability further reduces the comfort of the wearer.

The inventors of the present invention have appreciated the above problems and found that said problems can be alleviated by reducing the size of said segments and instead, include a plurality of unconnected segments upon the glove, such as several unconnected segments upon each finger. This means that the impact resistance of the glove can be maintained whilst providing increased flexibility and durability since the polyurethane layer is not bent and twisted upon movement such as bending of the fingers. However, problems have been encountered in attempting to manufacture said impact resistant garments. Whilst each small individual segment can be stitched on to the fabric in a similar manner to the prior known garments, such a process is not an economically viable manufacturing process because of the large amount of labour required to stitch each segment individually on to the fabric. Furthermore, it is not possible to use a single injection molding process to mold the segments at once since injection molding requires that all segments are linked to some extent so that a single mold for a plurality of segments can be fabricated before a liquid mixture is injected into the mold. Injection molding is not suitable for producing a plurality of non-interconnected segments.

Appreciating the above, the inventors of the present invention have sought to devise a process in which each polyurethane segment is molded and placed upon the fabric layer at once. In this regard, the inventors have developed a process in which a mold comprising separate cavities for molding each polyurethane segment is used. The uncured composition is then introduced to the mold before partially curing the polyurethane. A fabric layer is then placed upon the partially molded polyurethane and the polyurethane allowed to fully cure such that each polyurethane segment joins to the fabric layer. However, problems with developing this process have been encountered. Specifically, it has been found by the inventors that any air or gas present in the mold or polymer disrupts the curing properties and detrimentally affects the physical properties of the final polyurethane product. Furthermore, it has been found very difficult to mold segments with a sufficient profile depth for impact resistance without disrupting the patterning and geometry of the molded segments. This is due to the nature and rate of curing of the polyurethane composition. If the polyurethane composition is cured to too great an extent prior to application of the fabric layer, the fabric layer does not sufficiently adhere and join to the polyurethane segments. On the other hand, if the polyurethane is not sufficiently cured prior to application of the fabric, the segments effectively join and adhere to the fabric, but the patterning and geometry of the segments is disrupted. Such disruption is not aesthetically pleasing, reducing the marketability of the products. Said disruption also affects physical properties of the segments which can affect their impact resistance, since the impact resistance and other properties may be linked to the geometries of the respective segments.

SUMMARY OF THE INVENTION

The inventors of the present invention have developed a process of manufacturing an impact resistant textile-supported garment, or component thereof, which addresses the problems discussed above.

According to a first aspect of the invention, there is provided a process of manufacturing an impact resistant textile-supported garment, or component thereof, wherein the process comprises the following steps:
(i) providing a heat-curable composition suitable for forming a polyurethane;
(ii) providing a mold comprising two opposing surfaces, wherein the mold comprises at least one mold cavity with a depth of at least 3 mm in at least one of the two opposing surfaces;
(iii) introducing the heat-curable composition into the at least one mold cavity;
(iv) applying a vacuum to an interior of the mold such that the interior of the mold is substantially free of air;
(v) heating the heat-curable composition within the mold such that the composition cures to an extent of from 60% to 95%, in relation to the fully cured composition, so as to form a partially cured composition;
(vi) applying a fabric to the partially cured composition;
(vii) pressing the fabric and partially cured composition together such that the partially cured composition joins to the fabric; and
(viii) allowing the partially cured composition to fully cure and form a fully cured polyurethane composition with the fabric joined thereto, thereby forming the impact resistant textile-supported garment, or component thereof, wherein the impact resistant textile-supported garment, or component thereof, comprises at least one impact resistant segment with a depth of at least 3 mm upon a surface of the fabric.

Preferably, the mold comprises at least two non-interconnected mold cavities with a depth of at least 3 mm in at least one of the two opposing surfaces, wherein the at least two non-interconnected mold cavities define separate segments in at least one of the two opposing surfaces, and wherein the impact resistant textile-supported garment comprises at least two non-interconnected impact resistant segments with a depth of at least 3 mm upon a surface of the fabric.

Preferably, the impact resistant textile-supported garment is a glove.

Preferably, step (v) comprises heating the heat-curable composition to from 70% to 90% cure, preferably 75% cure to 85% cure, and most preferably to 80% cure, in relation to the fully cured polyurethane composition.

Preferably, the heat-curable composition comprises a polyol composition and an isocyanate composition.

Preferably, the isocyanate index of the heat curable composition is from 90 to 115, more preferably from 95 to 110, and most preferably from 98 to 105. Alternatively, the polyol composition and the isocyanate composition are present in a weight ratio of from 100:40 to 100:60, preferably from 100:45 to 100:55, and most preferably from 100:50 to 100:55.

Preferably, the polyol composition comprises:
(i) from 70 wt % to 90 wt % of one or more (polyether) polyols with a molecular weight of from 1800 to 5000;
(ii) from 2.5 wt % to 15 wt % of dipropylene glycol; and
(iii) from 2.5 wt % to 10 wt % of 1,4-butane diol.

Preferably, the one or more (polyether) polyols comprises (i) a propylene glycol initiated polypropylene glycol with a molecular weight of from 1950 to 2050, a hydroxyl number of from 52 to 60, or both; (ii) an ethylene oxide capped polypropylene glycol with a hydroxyl number of from 25 to 30, a molecular weight of from 3700 to 4100, or both; (iii) a (polyether) triol with a molecular weight of from 4700 to 5000, a hydroxyl number of from 32 to 36, or both; or (iv) a combination thereof.

In one embodiment, the propylene glycol initiated (polyether) polyol is a propylene glycol initiated polypropylene glycol, preferably, wherein the propylene glycol initiated polypropylene glycol has a molecular weight of 2000 and a hydroxyl number of 56, more preferably wherein the propylene glycol initiated (polyether) polyol is Voranol 2120.

In some embodiments, the one or more (polyether) polyols comprise (i) a propylene glycol initiated polypropylene glycol, preferably, wherein the propylene glycol initiated polypropylene oxide has a molecular weight of about 2000 and a hydroxyl number of 56, more preferably wherein the propylene glycol initiated (polyether) polyol is Voranol 2120; (ii) an ethylene oxide capped polypropylene glycol with a hydroxyl number of 28 and a molecular weight of about 3800, preferably wherein the ethylene oxide capped polypropylene glycol is Voranol EP1900; (iii) a (polyether) triol with a molecular weight of around 4800 and a hydroxyl number of 34, preferably wherein the (polyether) triol is Voranol 4701, or (iv) a combination thereof.

Typically, the one or more (polyether) polyols with a molecular weight of from 1800 to 5000 are present in a total amount of from 75 wt % to 85%, such as from 77 wt % to 82 wt %; the dipropylene glycol is present in an amount of from 6 wt % to 9 wt %, such as from 7 wt % to 8 wt %; and wherein the 1, 4-butane diol is present in an amount of from 3 wt % to 7 wt %, such as from 4 wt % to 6 wt %.

Typically, the polyol composition further comprises from 1 wt % to 10 wt %, such as from 2 wt % to 5 wt % of a moisture scavenger. Preferably, the moisture scavenger comprises a zeolite molecular sieve, such as Sylosiv A3, or p-toluenesulfonyl isocyanate.

Typically, the polyol composition further comprises from 0.5 wt % to 2.5 wt %, such as from 0.75 wt % to 1.5 wt % of a pigment, preferably wherein the pigment comprises Pigment 55252.

Typically, the polyol composition further comprises one or more degassing agents. Typically, the total amount of degassing agents in the polyol composition is from 0.5 wt % to 3 wt %. Preferably, the one or more degassing agents comprise one or more silicone-based defoaming agents, more preferably wherein the one or more silicone-based defoaming agents comprise Byk 066N, Byk 088, or both.

Typically, the polyol composition further comprises one or more dilatants, preferably wherein the one or more dilatants are present in a total amount of from 1 wt % to 5 wt %, such as from 2 wt % to 4 wt %. Preferably, the one or more dilatants comprise a blend of a silica and a diol with a molecular weight of from 300 to 500, preferably from 350 to 450.

Typically, the polyol composition further comprises one or more catalysts. Preferably, the one or more catalysts comprise zinc neodecanoate, bismuth neodecanaote, tertiary amine such as 1, 8-Diazabicyclo [5.4.0]undec-7-ene or 1, 4-diazabicyclo [2.2.2]octane, or any combination thereof. In some preferable embodiments, the one or more catalysts comprise zinc neodecanoate, bismuth neodecanaote and tertiary amine. More preferably, the one or more catalysts comprise Bicat Z, Bicat 8108, and POLYCAT SA8. Most preferably, the Bicat Z is present in an amount of from 0.025 wt % to 0.1 wt %, preferably from 0.03 wt % to 0.07 wt %; the Bicat 8108 is present in an amount of from 0.010 wt % to 0.05 wt %, preferably from 0.01 wt % to 0.02 wt %; and the POLYCAT SA8 is present in an amount of from 0.05 wt % to 0.20 wt %, preferably from 0.06 wt % to 0.12 wt %. In other embodiments, the one or catalysts comprise 1, 8-Diazabicyclo [5.4.0]undec-7-ene and 1, 4-diazabicyclo [2.2.2]octane. In these embodiments, preferably, the one or more catalysts comprise POLYCAT SA8 and DABCO 1028. Most preferably, the POLYCAT SA8 is present in an amount of from 0.1 wt % to 0.2 wt % and the DABCO 1028 is present in an amount of from 0.3 wt % to 0.4 wt %.

Preferably, the one or more catalysts are present in the polyol composition in a total amount of from 0.1 to 1 wt %.

Typically, the isocyanate composition comprises a methylene diphenyl diisocyanate (MDI). Preferably, the methylene diphenyl diisocyanate comprises Suprasec 2010.

In an embodiment, the polyol composition and isocyanate composition are contacted so as to form the heat-curable composition prior to introduction of the heat-curable composition into the mold. Preferably the polyol composition and isocyanate composition are contacted so as to form the heat-curable composition prior to introduction of the heat-curable composition into the mold.

Preferably, the process further comprises a step of degassing the heat-curable composition, isocyanate composition, polyol composition, or any combination thereof, by applying vacuum prior to introduction into the mold, such that said compositions are substantially free of air.

Preferably, the polyol composition and isocyanate composition are contacted so as to form the heat-curable composition prior to introduction of the heat-curable composition into the mold, and the process further comprises mixing the heat-curable composition prior to step (iii) of introducing the heat-curable composition into the mold.

Preferably, the process further comprises scraping a surface of the mold so as to remove excess heat curable composition from said surface that is not within the cavities of the mold. Typically, the step of scraping is carried out for from 1 minute to 3 minutes.

Preferably, prior to step (iii) of introducing the heat-curable composition to the mold, the heat-curable composition is mixed for a time period, preferably wherein the time period is from 2 to 4 minutes, more preferably from 2 to 3 minutes, and most preferably from 2.5 to 3 minutes.

Preferably, step (v) of heating the heat-curable composition within the mold comprises heating the heat-curable composition to a temperature of from 30° C. to 150° C., more preferably 750 to 150° C. and most preferably from 100° C. to 130° C.

Preferably, step (v) of heating the heat-curable composition within the mold comprises heating the heat-curable composition for a time period of from 5 minutes to 10 minutes, preferably from 400 seconds to 550 seconds, and most preferably from 450 seconds to 550 seconds.

Typically, the partially cured composition and fabric are pressed together for a time period of from 300 seconds to 800 seconds, preferably from 350 seconds to 7000 seconds, and most preferably from 500 seconds to 700 seconds.

Typically, the process further comprises a step of removing the impact resistant textile-supported garment from the mold.

Typically, the mold is not an injection mold, and the process does not comprise injection molding.

Typically, the mold comprises at least two discrete non-interconnected mold cavities, and may contain at least 3, 4, 5, 6, 7, 8, 9, 10 or more discrete non-interconnected mold cavities.

Typically, the impact resistant textile-supported garment, or component thereof, comprises at least five non-inter connected impact resistant segments upon an outer surface of the fabric.

Typically, at least five of the non-interconnected mold cavities or at least five of the non-interconnected impact resistant segments have a depth of at least 4 mm. Preferably, the depth of at least two mold cavities or at least two segments is at least 5 mm, 6 mm, 7 mm, 8 mm, 9 mm or 10 mm. More preferably, the depth of at least five non-interconnected mold cavities or at least five non-interconnected impact resistant segments is at least 5 mm, 6 mm, 7 mm, 8 mm, 9 mm or 10 mm.

Typically, each of the five segments have dimensions smaller than 1.75 cm×1 cm×1 cm.

In an embodiment, the mold comprises at least one cavity, wherein the at least one cavity has a depth of at least 3 mm at its deepest part, and wherein the at least one cavity comprises one or more regions shaped as a perimeter ditch surrounding an area of a surface of the mold. In some embodiments, the mold comprises 2, 3, 4, 5, 6, 7, 8, 9, 10 or more of such cavities.

In an embodiment, the impact resistant textile-supported garment comprises at least one impact resistant polyurethane segment, wherein the at least one segment has a depth of at least 3 mm at its deepest part, and wherein the at least one segment is a hollow segment comprising one or more regions defined by an outer polyurethane perimeter, surrounding a region of fabric that is not covered by polyurethane. In some embodiments, the impact resistant garment comprises 2, 3, 4, 5, 6, 7, 8, 9, 10 or more of such segments.

In an embodiment, the mold comprises at least 2, 3, 4, 5, 6, 7, 8, 9 or 10 non-interconnected cavities having a depth of at least 3 mm at their deepest part, the cavities each comprising one or more regions shaped as a perimeter ditch surrounding an area of a surface of the mold, and/or wherein the impact resistant textile-supported garment comprises at least 4, 5, 6, 7, 8, 9 or 10 non-interconnected impact resistant polyurethane segments, the segments each having a depth of at least 3 mm at their deepest part, and wherein the segments are hollow segments, each hollow segment comprising one or more regions defined by an outer polyurethane perimeter, surrounding a region of fabric that is not covered by polyurethane.

Preferably, the process further comprises a step of cleaning the mold prior to step (iii) of introducing the heat curable composition to the mold, preferably wherein the step of cleaning the mold comprises spraying the mold with a cleaning liquid.

In an embodiment, the impact resistant textile-supported garment is a glove. In such embodiments, preferably, the impact resistant textile-supported garment passes an EN388 impact resistance test. Alternatively, the impact resistant textile-supported glove may pass an ISEA 138 test at level 1, level 2 or level 3.

In other embodiments, the impact resistant textile-supported garment is a motorcycle limb protector such as an arm protector or a leg protector. In such embodiments, typically, the impact resistant textile-supported garment, or component thereof, has an average peak transmitted force of less than 25 kN when dry, and/or has an average peak transmitted force of less than 30 kN when wet. Alternatively, where the impact resistant textile-supported garment is a motorcycle limb protector such as an arm protector or leg protector, the garment may pass an EN1621-1 test at level 1 or level 2.

In a preferable embodiment, the impact resistant textile-supported garment is a glove comprising the fabric, wherein the glove comprises a main cavity for receiving a hand therein, interconnected to a plurality of smaller cavities for receiving each finger and the thumb of the hand; wherein the fabric defines an inner surface of the glove; and wherein each section of the fabric that defines each smaller cavity for receiving each finger and thumb of the hand, comprises at least two non-interconnected impact resistant polyurethane segments upon the outer surface thereof, wherein the at least two non-interconnected impact resistant polyurethane segments have dimensions smaller than 1.75 cm×1 cm×1 cm.

In another preferable embodiment, the impact resistant textile-supported garment is a glove, and wherein the process further comprises a step of forming the fabric into a glove shape, and applying said glove shaped fabric onto a hand shaped mold, and wherein step (iv) of applying the fabric to the partially cured composition comprises applying the hand shaped mold with the glove shaped fabric applied thereon onto the partially cured composition, and pressing together the hand shaped mold with the glove shaped fabric applied thereon and the partially cured composition.

According to a second aspect of the invention, there is provided an impact resistant textile-supported garment, or component thereof, obtainable or obtained by a method according to the first aspect of the invention.

According to a third aspect of the invention, there is provided an impact resistant textile-supported garment, or component thereof, comprising a fabric layer, and (i) at least five non-interconnected impact resistant polyurethane segments upon an outer surface of the fabric layer, wherein at least two of the non-interconnected impact resistant polyurethane segments has a depth of at least 4 mm, and wherein at least five of the plurality of non-interconnected segments have dimensions smaller than 1.75 cm×1 cm×1 cm; or (ii) at least one non-interconnected impact resistant polyurethane segments, wherein the at least one segment has a depth of at least 3 mm at its deepest part, and wherein the at least one segment is a hollow segment comprising one or more regions defined by an outer polyurethane perimeter, surrounding a region of fabric that is not covered by polyurethane.

Preferably, the impact resistant textile-supported garment, or component thereof, of the second and third aspects of the invention is as defined above in accordance with the first aspect of the invention.

In a preferable embodiment, the impact resistant textile-supported garment is a glove comprising the fabric layer, wherein the glove comprises a main cavity for receiving a hand therein, interconnected to a plurality of smaller cavities for receiving each finger and the thumb of the hand; wherein the fabric layer defines an inner surface of the glove; and wherein each section of the fabric that defines each smaller cavity for receiving each finger and thumb of the hand, comprises at least two non-interconnected impact resistant polyurethane segments upon the outer surface thereof, wherein the at least two non-interconnected impact resistant polyurethane segments have dimensions smaller than 1.75 cm×1 cm×1 cm, and wherein the at least two non-interconnected polyurethane segments have a depth of at least 5 mm.

In another embodiment, the impact resistant textile-supported garment comprises at least 4, 5, 6, 7, 8, 9 or 10 non-interconnected impact resistant polyurethane segments, the segments each having a depth of at least 3 mm at their deepest part, and wherein the segments are hollow segments, each hollow segment comprising one or more regions defined by an outer polyurethane perimeter, surrounding a region of fabric that is not covered by polyurethane.

According to a fourth aspect of the invention, there is provided a polyol composition for reacting with an isocyanate composition so as to form a polyurethane, wherein the polyol composition comprises:
(i) from 70 wt % to 90 wt % of one or more (polyether) polyols with a molecular weight of from 1800 to 5000;
(ii) from 2.5 wt % to 15 wt % of dipropylene glycol;
(iii) from 2.5 wt % to 10 wt % of 1,4-butane diol; and
(iv) a catalyst system for reacting the polyol composition with an isocyanate composition to form a polyurethane, wherein the catalyst system comprises zinc neodecanoate, bismuth neodecanaote and tertiary amine, or wherein the catalyst system comprises one or more tertiary amines.

Preferably, the polyol composition and/or isocyanate composition are as defined above in accordance with the first aspect of the invention.

According to a fifth aspect of the invention, there is provided a polyurethane composition obtainable or obtained by the reaction of a polyol composition according to the fourth aspect of the invention, with an isocyanate composition.

According to a sixth aspect of the invention, there is provided the use of a polyol composition according to the fourth aspect of the invention, a polyurethane composition according to the fifth aspect of the invention, or a catalyst system comprising zinc neodecanoate, bismuth neodecanoate and a tertiary amine in the manufacture of an impact resistant textile-supported garment, preferably, wherein the impact resistant textile-supported garment is a glove.

Preferably, the use comprises using the polyol composition, polyurethane composition or catalyst system in a process according to the first aspect of the invention. Preferably, the impact resistant textile-supported garment, or component thereof, is as defined in accordance with the second and third aspects of the invention.

DETAILED DESCRIPTION OF THE INVENTION

Heat Curable Compositions Suitable for Forming Polyurethanes

The heat curable compositions for use in the process of the invention comprise a polyol composition and an isocyanate composition. The polyol and isocyanate react together in the curing process within the mold so as to form a cured polyurethane composition.

The polyol composition and isocyanate composition may be reacted in any suitable ratio so as to form a polyurethane composition. The appropriate ratios of each composition to use in order for the compositions to react to successfully form a polyurethane will be apparent to those skilled in the art. It will be understood by the skilled person that the exact ratio to use will depend upon the specific nature of the polyol composition and the specific nature of the isocyanate composition, and the desired physical properties of the resultant polyurethane composition. In some applications, it will be desirable to react the polyol composition and isocyanate composition in a ratio such that all polyol present reacts with all isocyanate present. In other applications, it will be desirable to react the polyol composition and isocyanate composition in a ratio where there is excess polyol present, such that the cured polyurethane composition comprises some unreacted polyol. In the process of the invention, typically, the polyol composition and the isocyanate composition are present in a ratio of from 100:40 to 100:60 by weight, preferably from 100:40 to 100:55 by weight, and most preferably from 100:50 to 100:55 by weight. In other embodiments, the heat curable composition has an isocyanate index of from 90 to 115, preferably from 90 to 110, and more preferably from 98 to 105. The term isocyanate index as used herein is a commonly understood term of art that refers to the ratio of the amount of free OH moieties in the unreacted polyol composition to the amount of free NCO moieties in the unreacted isocyanate composition.

Figure 3:
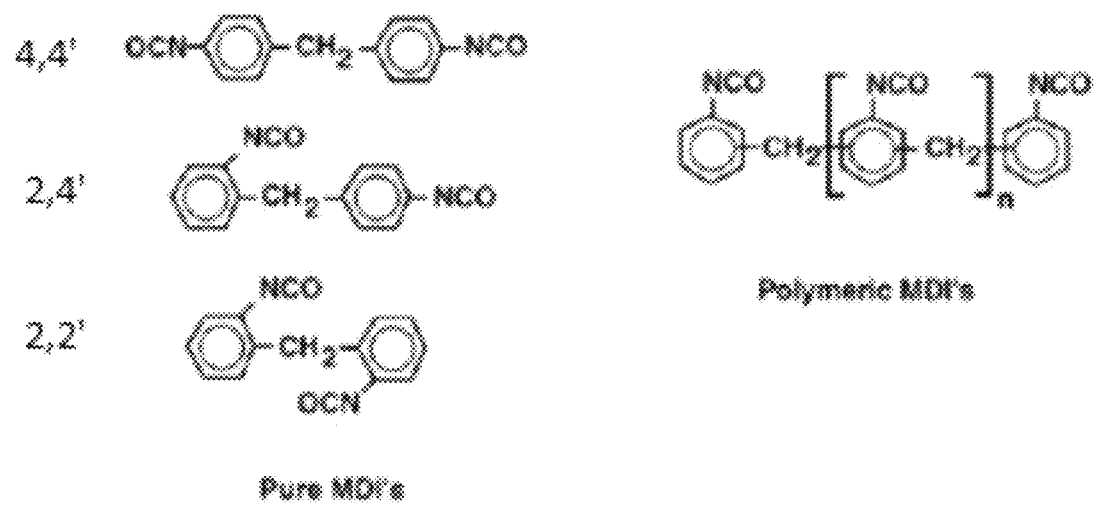
FIG. 3 is a diagram of the chemical structures of various methylene diisocyanates.

The isocyanate composition used in the process of the invention may be any suitable isocyanate composition known to the skilled person as being suitable for forming polyurethanes. Preferably, the isocyanate composition comprises a methylene diphenyl diisocyanate (MDI). Methylene diphenyl diisocyanates are aromatic compounds that typically exist as one of three isomers. (4, 4', 2, 4', and 2, 2' MDI). MDIs can also be polymeric. The structures of these compounds are shown in FIG. 3. Preferably, the diisocyanate for use in processes of the invention is that commercially available as Suprasec 2010, available from Huntsman. Suprasec 2010 is a 2, 1 functionality MDI with an NCO content of 26.3% and a viscosity of 140 mPa·s @ 25° C. Whilst said S2010 is the preferred MDI for use in processes of the invention, the exact nature of the MDI is not believed to be essential to the invention, and other MDIs with similar properties to Suprasec 2010 may also be used. Such similar MDIs will be known to the skilled person. In some embodiments, the isocyanate composition for use in the invention comprises a methylene diphenyl diisocyanate with an NCO moiety percentage of from 15 to 33, more preferably 23 to 31, and most preferably from 25 to 27.

The polyol composition may be any suitable polyol composition known to the skilled person as being suitable for forming polyurethanes. As discussed above, the skilled person will understand that the specific nature of the one or more polyols in the polyol composition, their respective ratios to one another within the polyol composition, and the ratio of the polyol composition to the isocyanate composition (i.e. whether there is excess polyol present or not) will affect the specific balance of properties of the cured polyurethane composition.

In an embodiment, the polyol composition used in the process of the invention comprises:
 (i) from 70 wt % to 90 wt % of one or more (polyether) polyols with a molecular weight of from 1800 to 5000;
 (ii) from 2.5 wt % to 15 wt % of a diol comprising from 4 to 10 carbon atoms, and further comprising an ether moiety; and
 (iii) from 2.5 wt % to 10 wt % of a diol comprising from 2 to 5 carbon atoms.

In one embodiment, the polyol composition comprises:
 (i) from 70 wt % to 90 wt % of one or more (polyether) polyols with a molecular weight of from 1800 to 5000;
 (ii) from 2.5 wt % to 15 wt % of dipropylene glycol; and
 (iii) from 2.5 wt % to 10 wt % of 1,4-butane diol.

The one or more (polyether) polyols with a molecular weight of from 1800 to 5000 may be any suitable (polyether) polyol. Preferably, the (polyether) polyol is as described above, and is present in the polyol composition in the amounts described above.

In some embodiments, the one or more (polyether) polyols used may be optimised for a given function of the resultant polyurethane. For example, in embodiments where the polyurethane is to be used in an impact resistant garment, or component thereof that is used as a motor cycle limb protector, the one or more (polyether) polyols may comprise a propylene glycol initiated polypropylene glycol with a molecular weight of from 1950 to 2050, a hydroxyl number of from 52 to 60, or both, such as Voranol 2120.

In other embodiments, where the impact resistant garment, or component thereof is to be used in an impact resistant glove, the one or more (polyether) polyols used may comprise both (i) an ethylene oxide capped polypropylene glycol with a hydroxyl number of from 25 to 30, a molecular weight of from 3700 to 4100, or both; and (ii) a (polyether) triol with a molecular weight of from 4700 to 5000, a hydroxyl number of from 32 to 36, or both. In preferable embodiments, where the impact resistant garment, or component thereof is to be used in an impact resistant glove, the one or more (polyether) polyols comprise Voranol EP1900 and Voranol 4701. In such embodiments, ethylene oxide capped polypropylene glycol with a hydroxyl number of from 25 to 30, a molecular weight of from 3700 to 4100, or both such as Voranol EP1900 is preferably present in an amount of from 65% to 75% by weight of the polyol composition, and the (polyether) triol with a molecular weight of from 4700 to 5000, a hydroxyl number of from 32 to 36, or both such as Voranol 4701 is preferably present in an amount of from 5% to 15% by weight of the polyol composition.

In a highly preferable embodiment, the (polyether) polyol comprises Voranol 2120, available from the DOW chemical company. Voranol 4701 and Voranol EP1900 are also available from the DOW chemical company.

Without being limited by theory, it is believed that the nature of the specific polyols in the polyol composition and their respective ratios affect the physical properties and thus impact resistance of the cured polyurethane composition. For example certain polyols have been found to provide the necessary viscoelasticity, which is linked to impact resistance, but do not provide sufficient strength. In contrast, other polyols have been found to provide the sufficient strength, but do not have suitable viscoelasticity and impact resistance. It is thus desirable to achieve a balance of these two properties when providing a polyurethane for use in an impact resistant garment. It has been found that such a balance is achieved by using the specific mixture of polyols discussed above, in the ratios discussed above. Accordingly, polyol compositions of the invention have been found, advantageously to provide improved polyurethane polymers for use in impact resistant garments since polyurethanes made from said polyols have improved impact resistance properties whilst also having the desired strength. Polyols such as the DPG and 1, 4-BD may be obtained commercially for any suitable source.

As discussed above, the polyol composition may contain any of the additives discussed above such as moisture scavengers, pigments, degassing agents, dilatants and catalysts. The polyol composition (and indeed the isocyanate composition) may also contain additional additives to those discussed above. Suitable additives will be known to the person skilled in the art. The additives discussed above are preferably present in the polyol compositions in the amounts discussed above.

Of the additives discussed above, it has been found particularly beneficial to include one or more degassing agents in the polyol composition in order to reduce air bubble formation in the heat-curable composition as it cures into a polyurethane. The presence of air bubbles has been found to negatively affect the physical properties of the polyurethane composition by interfering with the curing process. This can negatively affect the impact resistance of the polyurethane, as well as other negative properties. Accordingly, the inclusion of a degassing agent in a polyol composition for forming a polyurethane has been found by the inventors to be particularly desirable when the polyurethane is intended for use in impact resistance applications. As discussed above, silicone-based defoaming agents such as Byk066N and Byk 088 available from Byk additives & Instruments are highly preferred, although it will be understood that other similar defoaming and degassing agents may be used.

Moisture scavengers are also desirable additives to include in the polyol compositions. Moisture scavengers typically function by absorbing any trace amounts of water that may be present in the composition, which can also interfere with the curing process. The presence of water in the composition may also lead to undesirable foaming since water present may react with isocyanate to form carbamic acid. Carbamic acid degrades to form carbon dioxide and amine. The carbon dioxide gas forms foaming in the polyurethane. Preferred moisture scavengers include zeolite molecular sieves such as Sylosiv A3, available from GRACE, although it will be understood that other similar moisture scavenges may be used. Examples of other moisture scavengers that can used include p-toluenesulfonyl isocyanate and similar compounds known in the art to provide a moisture scavenging effect.

Pigments function so as to control the colour of the cured polyurethane composition. Suitable pigments for inclusion will be known to the skilled person.

Dilatants function as shear thickening additives. Preferred dilatants for use in the polyol composition include a blend of a silica and a diol with a molecular weight of from 300 to 500, preferably from 350 to 450, and most preferably of about 400. Other similar dilatants may also be used in the polyol compositions and will be known to the skilled person.

The polyol composition may include one or more catalysts, which are preferably present in the amounts discussed above. The one or more catalysts function so as to initiate and cause curing of the polyurethane. In this respect, the catalysts initiate and control the reaction of the polyol composition with the isocyanate composition so as to form the cured polyurethane. Some catalysts that are present in the composition will initiate the reaction with the isocyanate composition as soon as both compositions are mixed, and do not require the application of any heat. In contrast, some catalysts only start functioning and catalysing the reaction between the polyol and isocyanate compositions once some degree of heat is applied to the mixed compositions. The different properties of different catalysts allow a particular catalyst package to be optimised for a particular process.

In a preferred embodiment, the one or more catalysts comprise zinc neodecanoate, bismuth neodecanaote, tertiary amine, or any combination thereof. More preferably, the one or more catalysts comprise zinc neodecanoate, bismuth neodecanaote and tertiary amine such as 1, 8-Diazabicyclo[5.4.0]undec-7-ene. Most preferably, the one or more catalysts comprise Bicat Z, Bicat 8108, and POLYCAT SA8. Bicat Z comprises zinc neodecanoate, Bicat 8108 comprises bismuth neodecanoate and POLYCAT SA8 comprises the tertiary amine 1, 8-Diazabicyclo[5.4.0]undec-7-ene. The Bicat catalysts are available from Shepherd Chemical and the POLYCAT SA8 is available from Evonik.

Bicat Z typically comprises zinc in an amount of 20% by weight. Bicat 8108 typically comprises bismuth in amount of around 20% by weight. POLYCAT SA8 typically comprises 1, 8-Diazabicyclo[5.4.0]undec-7-ene in an amount of about 25% by weight.

In preferred embodiments, the Bicat Z is present in an amount of from 0.025 wt % to 0.1 wt %; the Bicat 8108 is present in an amount of from 0.010 wt % to 0.05 wt %; and the POLYCAT SA8 is present in an amount of from 0.05 wt % to 0.2 wt %.

In highly preferred embodiments, the Bicat Z is present in an amount of from 0.04 wt % to 0.06 wt %; the Bicat 8108 is present in an amount of from 0.014 wt % to 0.015 wt %; and the POLYCAT SA8 is present in an amount of from 0.08 wt % to 0.10 wt %. Accordingly, in the above embodiments, preferably, the one or more catalysts comprise 0.025 wt % to 0.1 wt % of a first catalyst comprising zinc neodecanoate, wherein the first catalyst comprises zinc in an amount of from 15% to 25% by weight; from 0.010 wt % to 0.05 wt % of a second catalyst comprising bismuth neodecanoate, wherein the second catalyst comprises bismuth in an amount of from 15% to 25% by weight, and from 0.05 wt % to 0.2 wt % of a third catalyst comprising 1, 8-Diazabicyclo[5.4.0]undec-7-ene in an amount of from 20% to 30% by weight.

The POLYCAT SA8 is a heat activated polyurethane curing catalyst. Typically, the POLYCAT SA8 catalyst activates at around 70° C. The zinc neodecanoate and bismuth neodecanaote are not heat activated catalysts, and can be referred to as standard catalysts. Without being limited by theory, it is believed that the particular combination of tertiary amine, zinc neodecanoate and bismuth neodecanaote (and preferably in the amounts specified above) provide particular advantages when used in the process of the invention for manufacturing impact resistant textile-supported garments.

As will be explained in more detail below, it has been found desirable by the inventors of the present invention for the polyol composition and isocyanate composition to be mixed so as to form a heat curable composition, prior to said heat curable composition being introduced to the mold. It is desirable that the heat curable composition is left to stand, whilst preferably being stirred or mixed for a period of time prior to the composition being cured within the mold. This period of time is referred to as the "work" time. Having a work time is advantageous in that it allows any air entrained within the heat curable composition to be removed, such as during stirring. Such a process is referred to as degassing, and may be aided by the presence of the one or more degassing agents. The work time also allows for the polyol composition to be effectively mixed with the isocyanate composition.

It has been found that the mixture of heat activated tertiary amine, zinc neodecanoate and bismuth neodecanaote provides a slow rate of curing initially, allowing the heat-curable composition to undergo a sufficient work time while the polymer remains a liquid, before providing a much faster rate of curing once the polymer is subjected to the heat within the mold. Accordingly, the specific blend of catalysts is optimised for the process. It is desirable to have a catalyst blend that provides a sufficiently long work time, but with a fast enough cure time to be viable for use in a large scale production process. If no heat activated catalyst is included, and only standard catalyst is used, it has been found that the either the cure time during heating takes too long, making the process less desirable for a large scale manufacturing process, or, that the work time prior to heating and curing is insufficiently short.

The embodiments discussed above where the one or more catalysts comprise zinc neodecanoate, bismuth neodecanoate and tertiary amine are preferable where the impact resistant textile-support garment or component thereof is used as a motor cycle limb protector. Accordingly, in certain embodiments, the one or more catalysts are as described above, and the polyol composition comprises a propylene glycol initiated polypropylene glycol with a molecular weight of from 1950 to 2050, a hydroxyl number of from 52 to 60, or both, such as Voranol 2120. In such embodiments, the impact resistant textile-supported garment or component thereof may be used in motor cycle limb protectors.

In other embodiments, the one or more catalysts comprise one or more tertiary amines. Preferably, the one or more tertiary amines comprise 1, 8-Diazabicyclo[5.4.0]undec-7-ene and 1, 4-diazabicyclo [2.2.2]octane. More preferably, the one or more catalysts comprise POLYCAY SA8 and DABCO 1028. Most preferably, the one or more catalysts comprise POLYCAT SA8 in an amount of from 0.1 wt % to 0.2 wt %, and DABCO 1028 in an amount of from 0.3 wt % to 0.4 wt %. These embodiments where the one or more catalysts comprise 1, 8-Diazabicyclo[5.4.0]undec-7-ene and 1, 4-diazabicyclo [2.2.2]octane have been found preferable when the impact resistant textile-support garment or component thereof is used as an impact resistant glove. Accordingly, in certain embodiments, the one or more catalysts are as described above, and the polyol composition comprises(i) an ethylene oxide capped polypropylene glycol with a hydroxyl number of from 25 to 30, a molecular weight of from 3700 to 4100, or both; and (ii) a (polyether) triol with a molecular weight of from 4700 to 5000, a hydroxyl number of from 32 to 36, or both. In preferable embodiments, where the impact resistant garment, or component thereof is to be used in an impact resistant glove, the one or more (polyether) polyols comprise Voranol EP1900 and Voranol 4701. In the above described embodiments, POLYCAT SA8 is a heat activated catalyst that is activated during the curing process, whereas DABCO 1028 is a non-acid blocked delayed action catalyst.

In embodiments where the one or more catalysts comprise zinc neodecanoate, bismuth neodecanoate and tertiary amine such as 1, 8-Diazabicyclo[5.4.0]undec-7-ene, the polyol composition and isocyanate composition are typically reacted with a isocyanate index of from 90 to 100, such as 94 to 96.

In embodiments where the one or more catalysts comprise only tertiary amine such as 1, 8-Diazabicyclo[5.4.0]undec-7-ene and 1, 4-diazabicyclo [2.2.2]octane, the polyol composition and isocyanate composition are typically reacted with a isocyanate index of from 100 to 10, such as from 104 to 106.

Processes of manufacturing impact resistant textile-supported garments. The process of the invention comprises step (ii) of providing a mold comprising two opposing surfaces, wherein the mold comprises at least one mold cavity with a depth of at least 3 mm in at least one of the two opposing surfaces, wherein the at least two non-interconnected mold cavities define separate segments in at least one of the two opposing surfaces. Suitable molds and methods for their operation will be known to the skilled person.

The two opposing surfaces of the mold can be described as upper and lower surfaces that face each other. Typically, the mold cavities for receiving the heat curable composition will be within the lower surface of the mold, such that the heat curable composition can be poured into the cavities within the mold surface.

Figure 4:
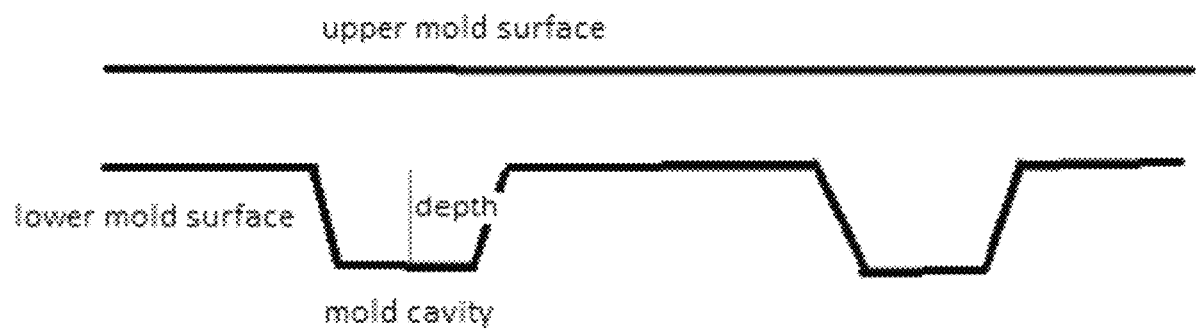
FIG. 4 is a diagram of a mold that can be used in the process of the invention comprising two mold cavities in a lower surface of the mold.

The terms "non-interconnected mold cavities" as used herein refer to two separate cavities within a mold surface such that when the two cavities are filled up to the level of the mold surface in which the cavity is in with liquid composition, the compositions within each cavity are not in fluid communication. In this respect, when the composition within each cavity cures to form solid polymer segments, each segment is separated. The term "depth" as used herein with respect to a mold cavity is used to refer to the distance from the deepest part of the mold cavity up to the level of the mold surface, along a line that is perpendicular to the mold surface. FIG. 4 shows a diagram of a mold comprising two opposing surfaces, with two non-interconnected mold cavities within the lower mold surface. The depth of one of the cavities is shown.

It will be understood by the skilled person that the two opposing surfaces of the mold (i.e. the upper and lower surfaces) may be detached or removed from one another. Accordingly, in the process steps described herein, the process steps can be carried out with only one surface of the mold (i.e. the lower surface with mold cavities therein) being present, with the opposing upper surface being temporarily detached. For example, the upper surface may be detached or removed when the liquid composition is poured into the mold cavities. In contrast, for other process steps, the upper surface of the mold will generally be present such that the opposing mold surfaces define an interior chamber there between. For example, when vacuum is applied to the mold, an upper surface of the mold will be present to define a chamber therein. Similarly, when fabric is pressed onto the top of the mold cavities, the upper surface will typically be present so as to press the fabric underneath onto the composition curing within the mold cavities. It will also be understood that the upper mold surface without the cavities therein may be substituted with a different upper mold surface for the carrying out of different process steps. For example, a different upper mold surface may be present when the liquid composition within the mold is being subjected to vacuum than when the partially cured composition is having fabric pressed onto it.

The mold typically comprises at least three discrete non-interconnected mold cavities, and may contain at least 4, 5, 6, 7, 8, 9 or 10 discrete non-interconnected mold cavities.

In an embodiment, at least five of the non-interconnected mold cavities have a depth of at 3 mm, and preferably at least 4 mm. In another embodiment, the depth of at least two mold cavities is at least 5 mm, 6 mm, 7 mm, 8 mm, 9 mm or 10 mm. In a further embodiment, the depth of at least five non-interconnected mold cavities or at least five non-interconnected impact resistant segments is at least 5 mm, 6 mm, 7 mm, 8 mm, 9 mm or 10 mm. In a further embodiment, each of the five segments have dimensions smaller than 1.75 cm×1 cm×1 cm. It will be understood that the number of cavities in the mold, the depth and dimensions of each cavity may be varied depending on the desired placement of polyurethane segments upon the surface of the textile supported garment, or component thereof.

Figure 6:
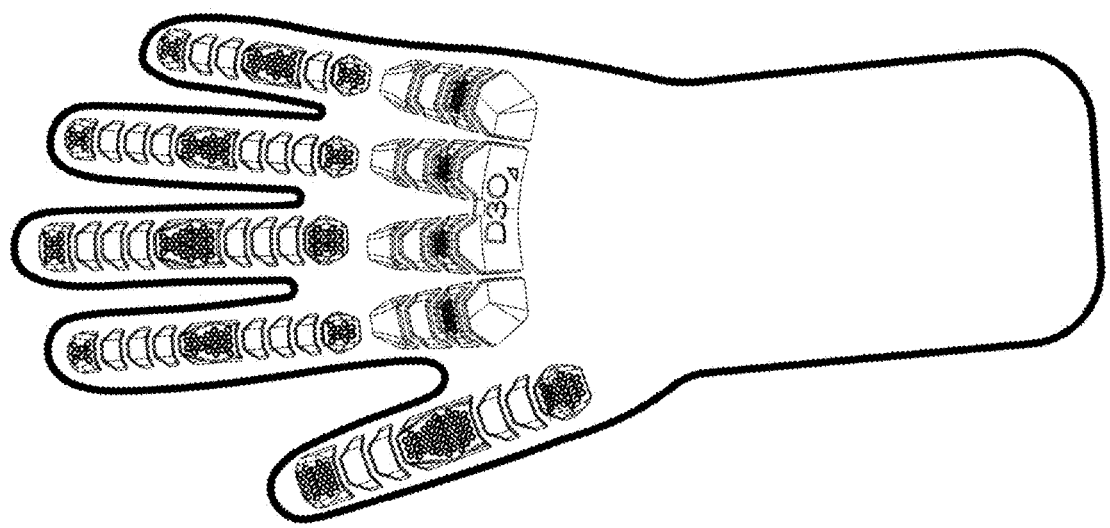
FIG. 6 is an illustration of a glove according to one embodiment of the present invention.

In some embodiments, the mold comprises cavities such as those depicted in FIG. 4, which can be used to mold polyurethane segments such as those of the glove shown in FIG. 6.

Figure 10:
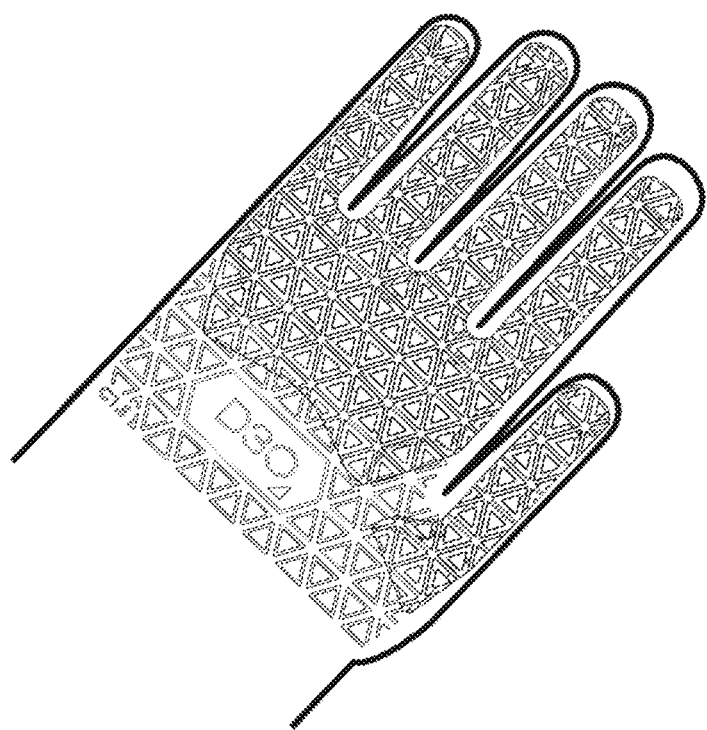
FIG. 10 is an illustration of a glove manufactured using the process of the invention.
Figure 11:
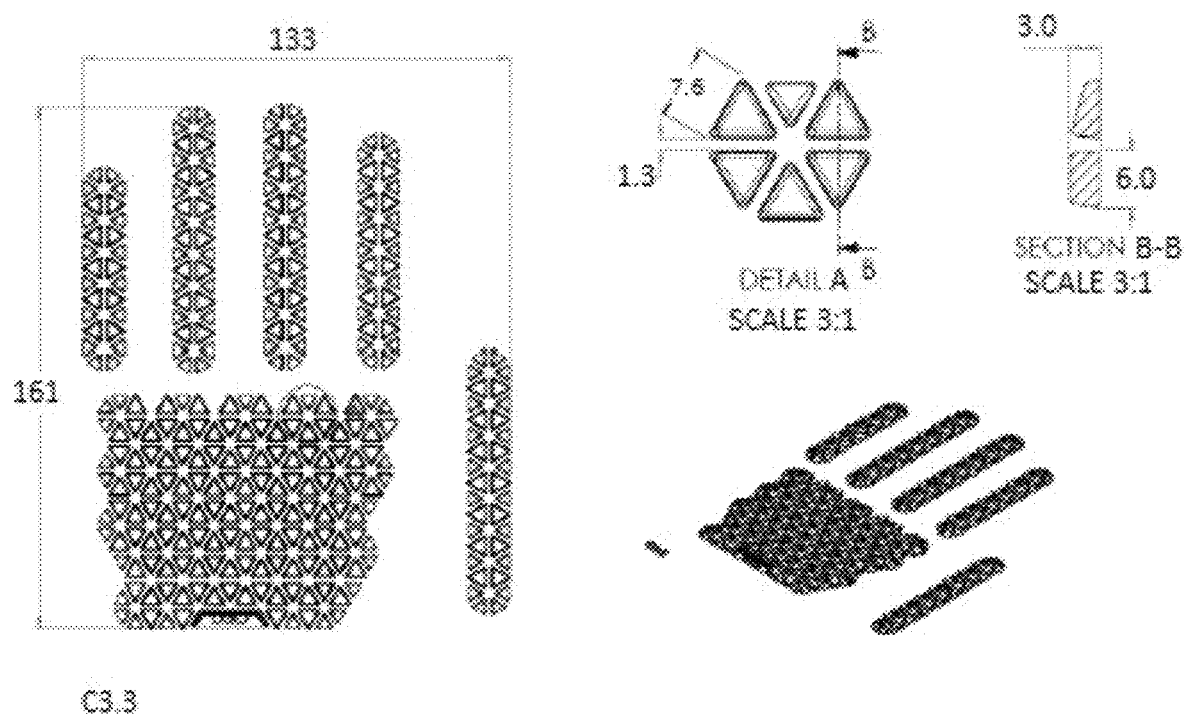
FIGS. 11 to 16 are scale drawings of a glove according to the present invention.
Figure 12:
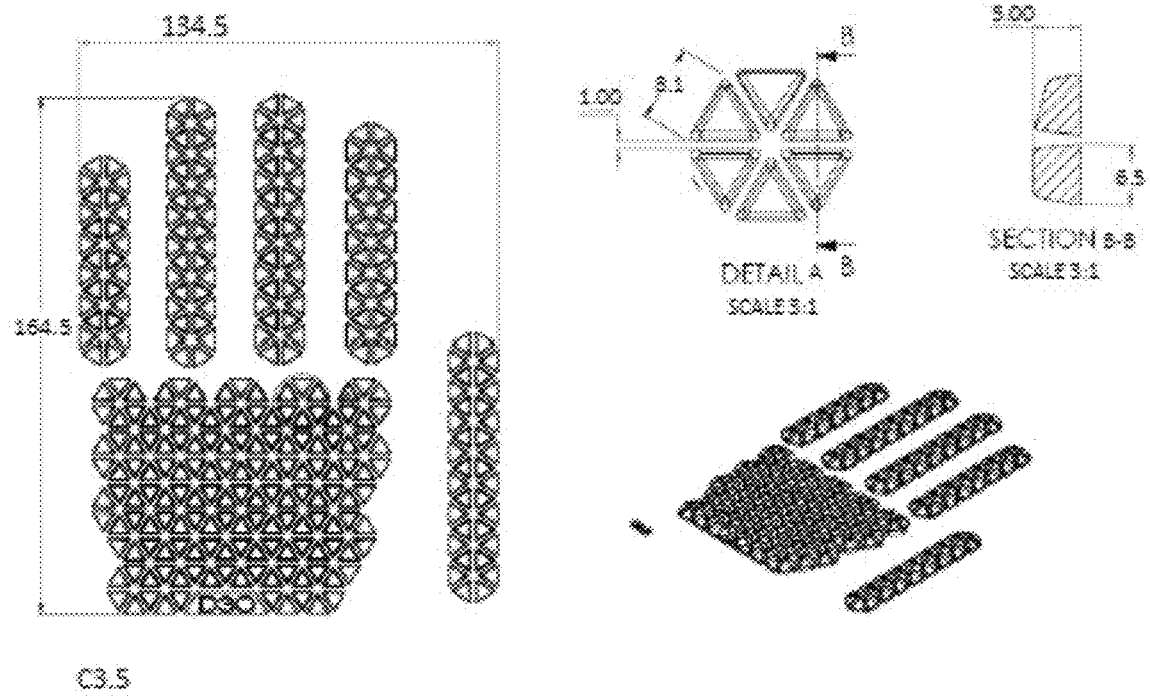
Figure 13:
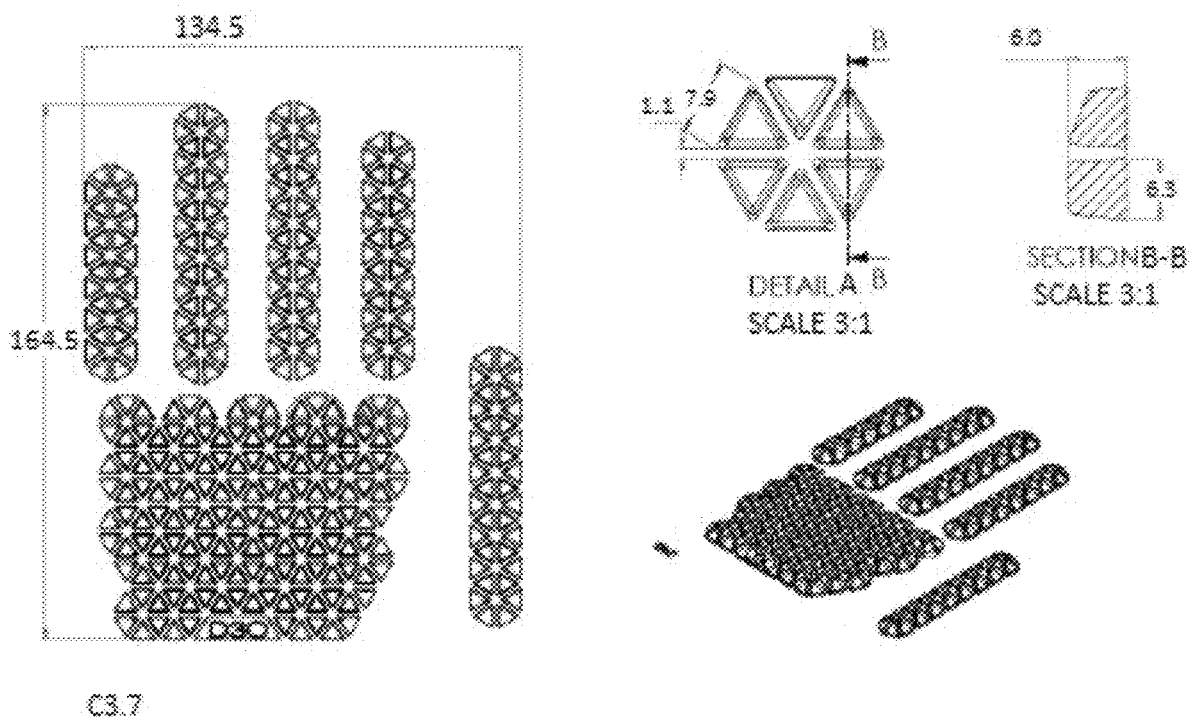
Figure 14:
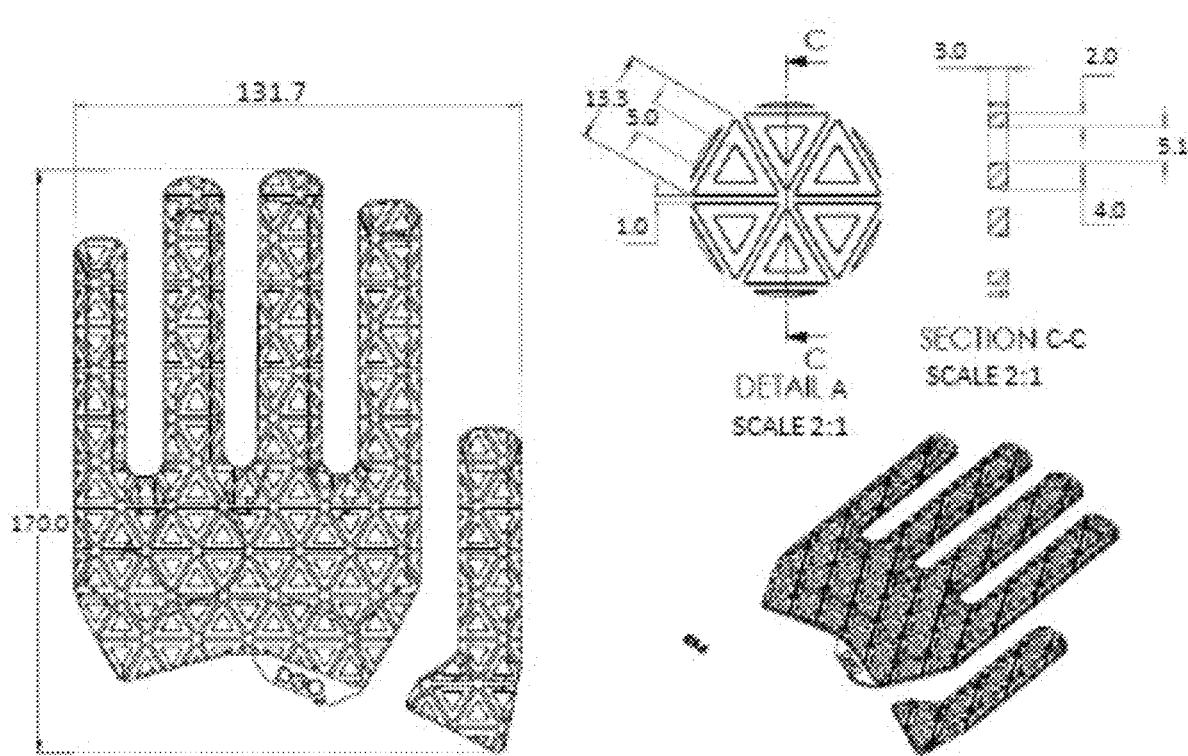
Figure 15:
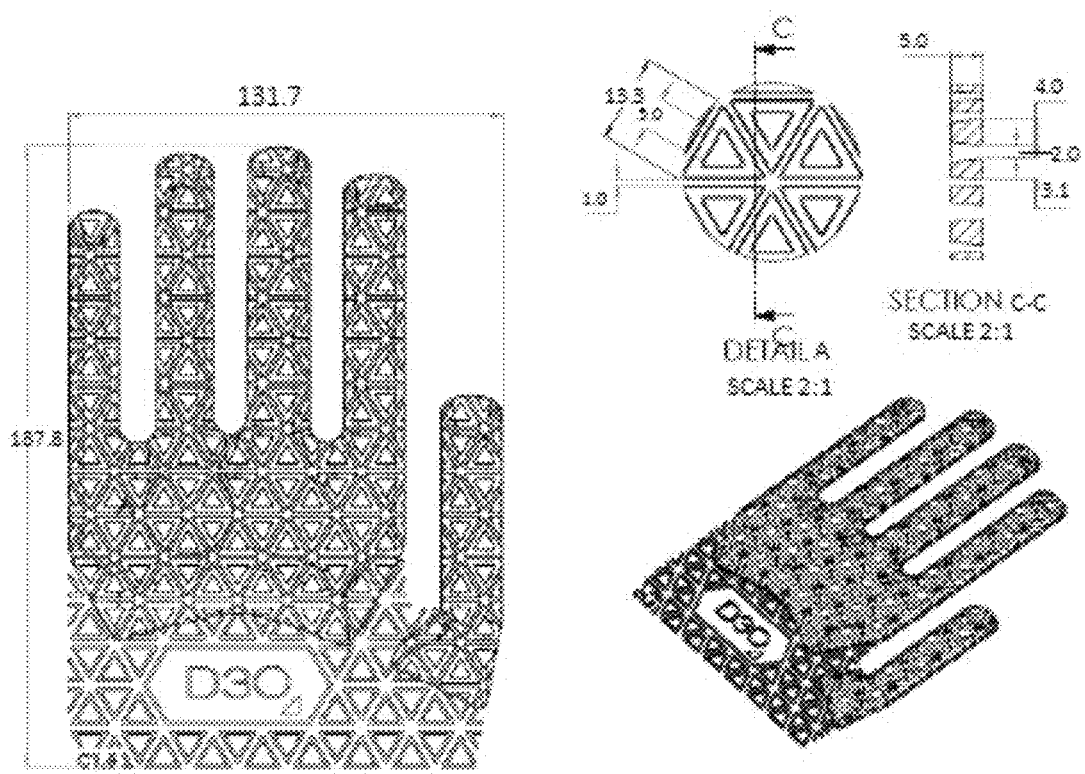
Figure 16:
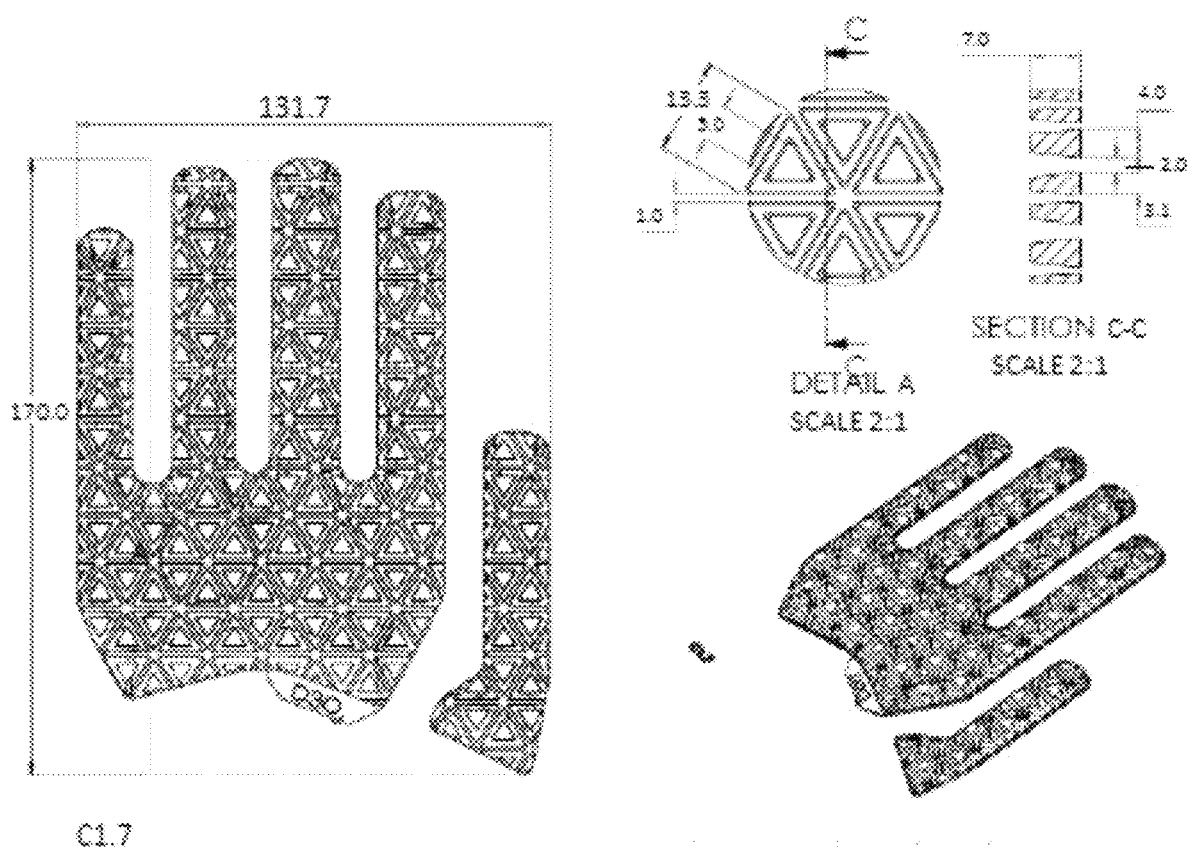
Figure 17:
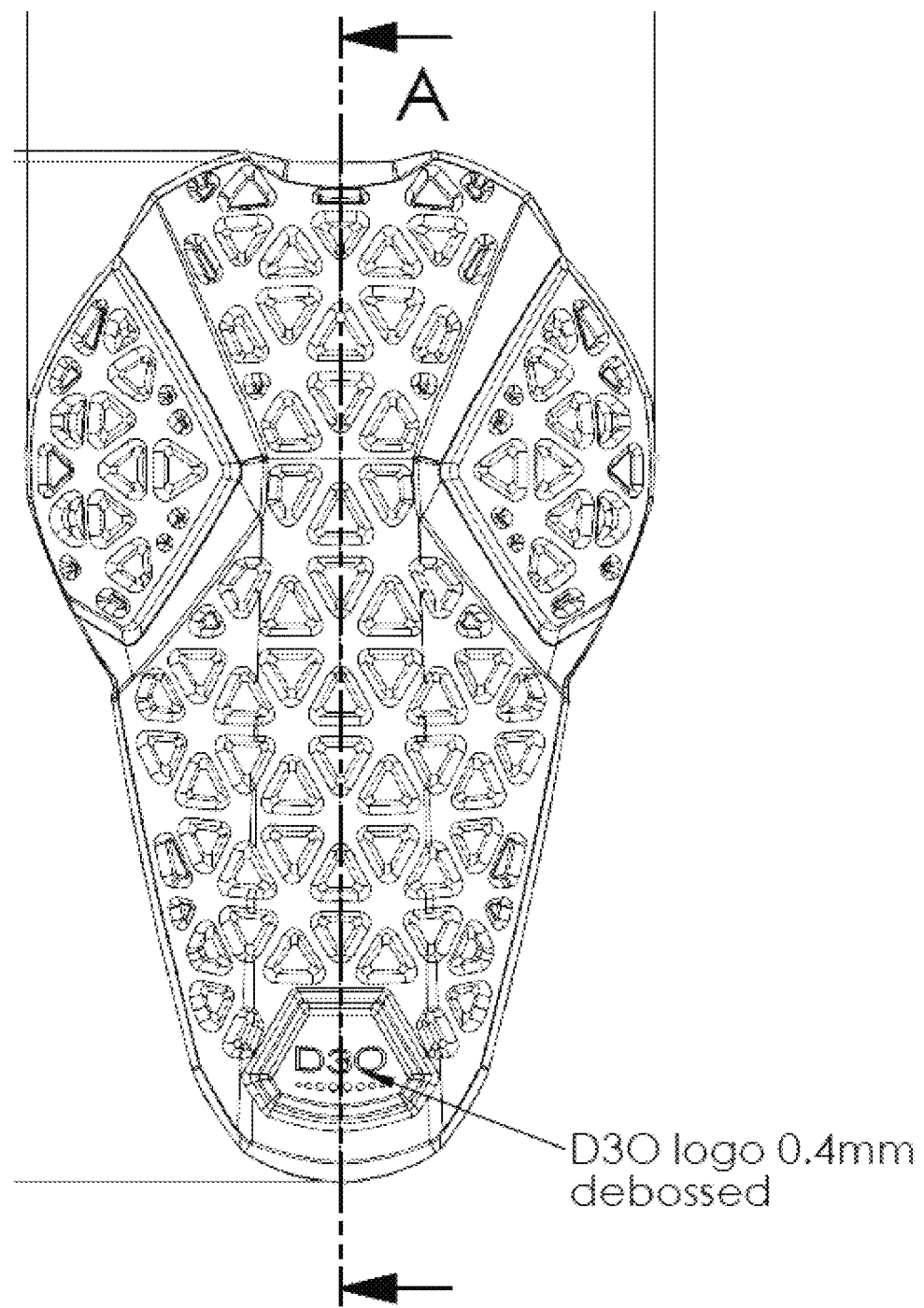
FIGS. 17, 18 and 19 are scale drawings of previously known impact resistant garments that are not made by the process of the invention.
Figure 18:
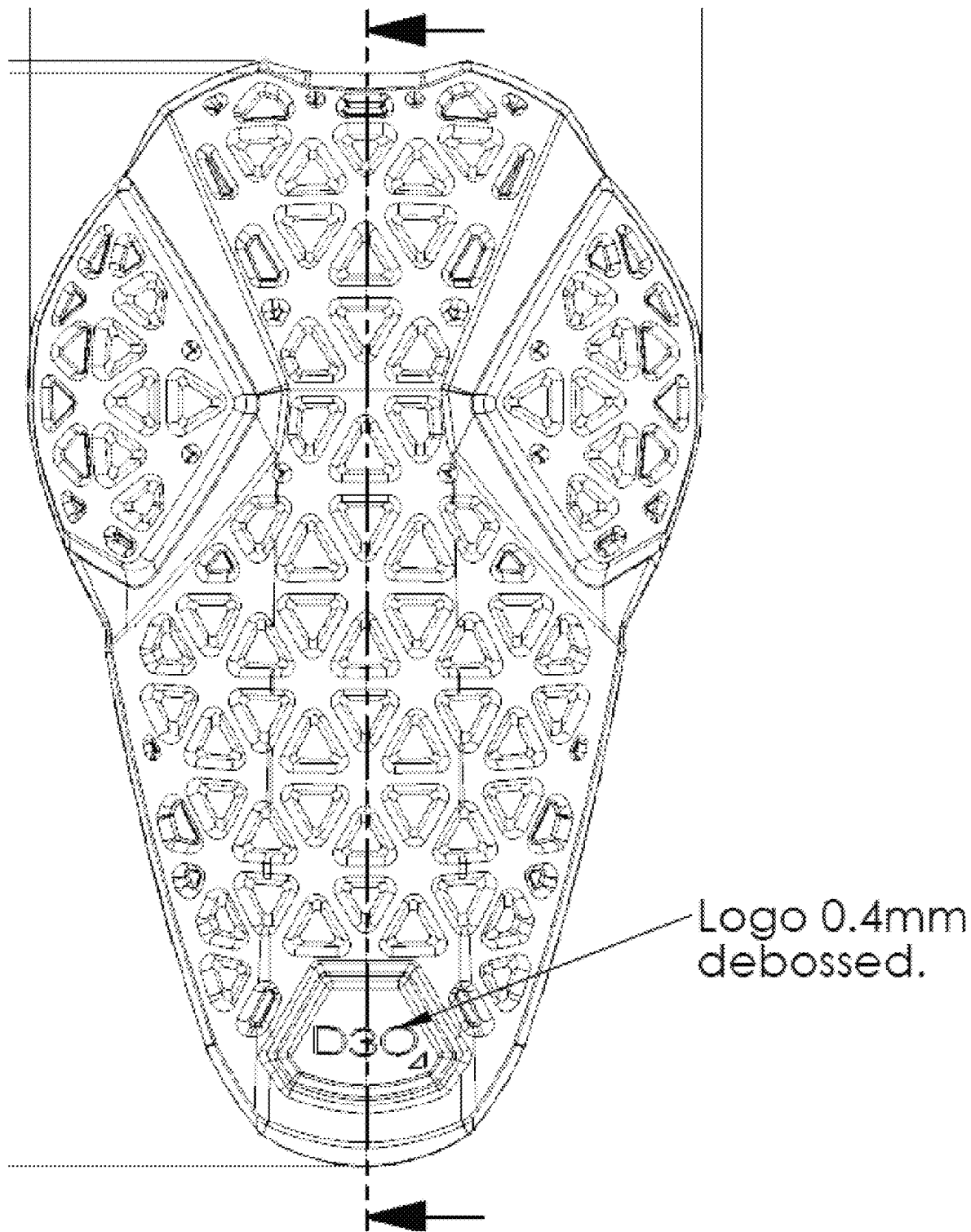
Figure 19:
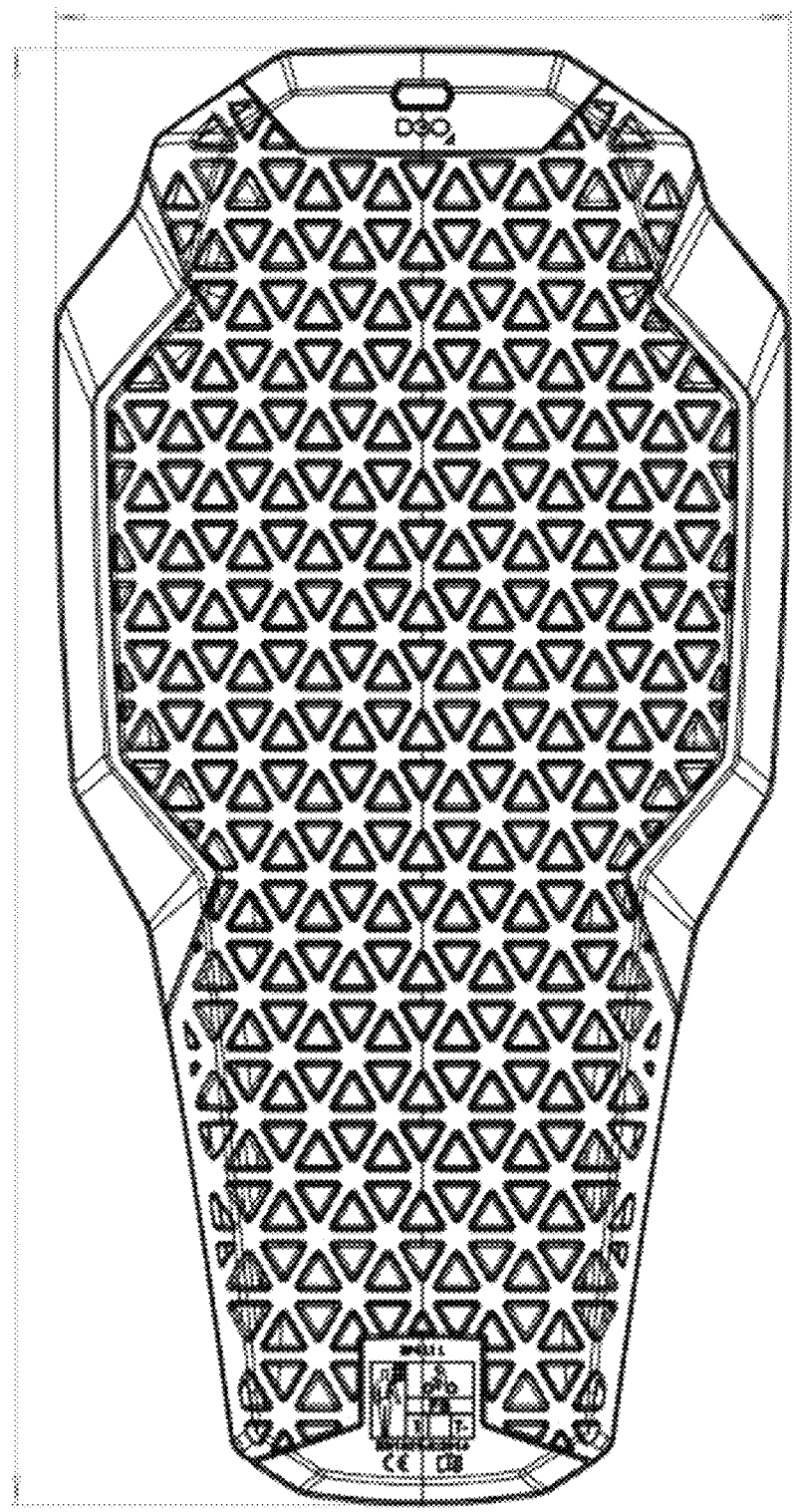
Figure 20:
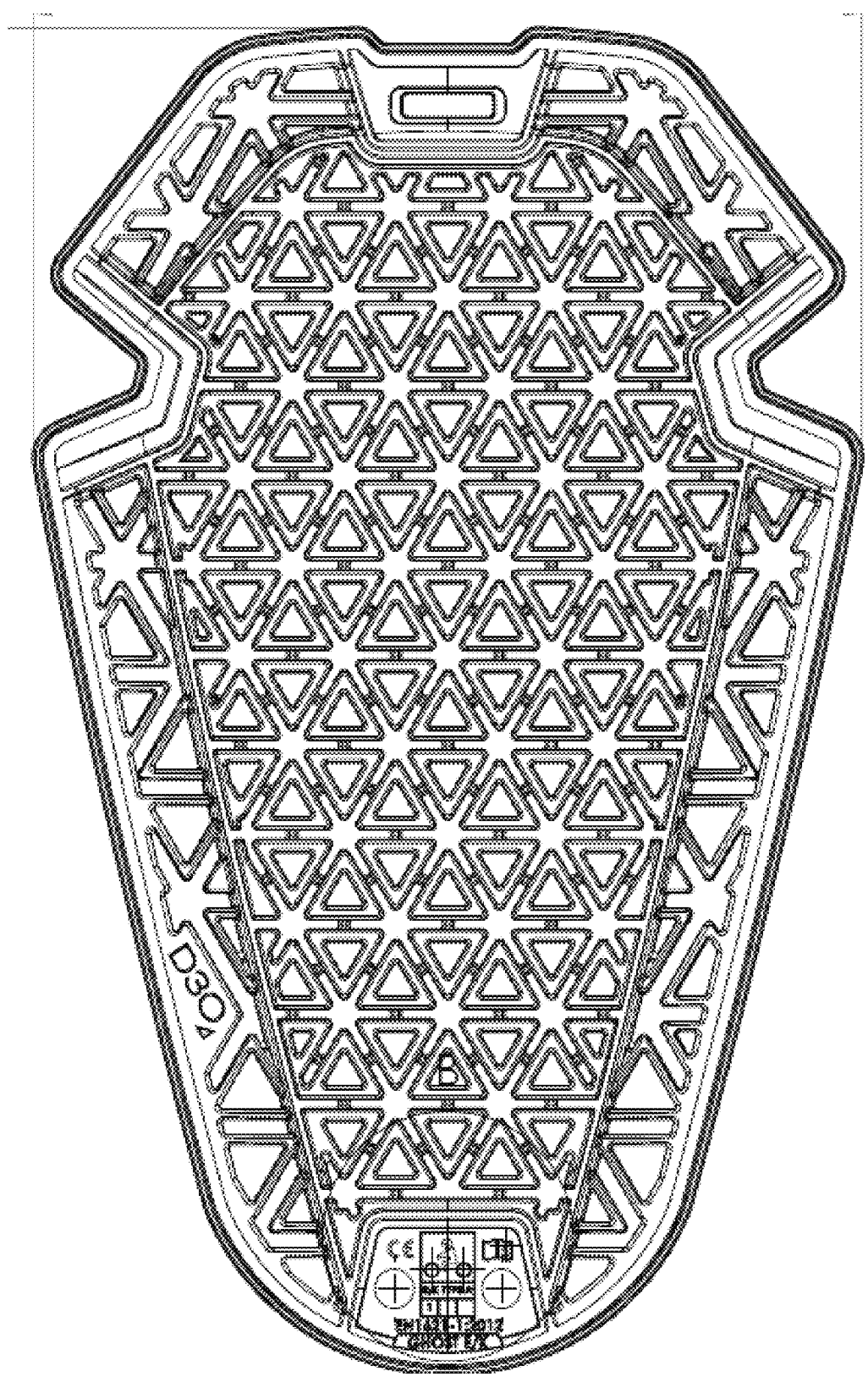
FIG. 20 is a scale drawing of a kneepad according to the present invention.

In other embodiments, the cavities may be of a more complex geometry, and take the form of circular shaped or triangular shaped ditches surrounding a central island. Such cavity geometries may be used to form cavities upon a fabric surface such as shown in FIG. 10. The hollow triangular shaped segments may be formed from mold cavities that take the form of triangular shaped ditches for receiving the liquid heat curable composition, surrounding an island of a part of the lower surface of the mold. Accordingly, the process of the invention can thus be used advantageously to provide complex geometries of non-interconnected polyurethane segments. The embodiment shown in FIG. 10 can be used to provide some level of impact resistance to the entirety of the back of the hand, whilst still providing some degree of flexibility due to the non-interconnected segments and the areas of uncovered fabric within the centre of each hollow segment. In further embodiments, some of the non-interconnected segments such as the triangles shown in FIG. 10 may be connected to adjacent triangular segments by small sections of polyurethane connecting each segment. In such embodiments, the adjacent segments link up to form larger segments.

The process of the invention comprises step (iii) of introducing the heat-curable composition into the at least two non-interconnected mold cavities. The polyol composition and isocyanate composition can be contacted so as to form the heat-curable composition prior to introduction of the heat-curable composition into the mold.

As discussed above, preferably, the polyol composition and isocyanate composition are contacted so as to form the heat-curable composition prior to introduction of the heat-curable composition into the mold. The heat-curable composition may the undergo a "work time" prior to introduction into the mold as discussed in further detail above. Preferably, the process further comprises stirring and mixing the heat-curable composition prior to step (iii) of introducing the heat-curable composition into the mold during the work time. Preferably, the work time which can be defined as the time between contacting the polyol composition with the isocyanate composition, before the composition is introduced to the mold, during which the composition is optionally stirred and mixed, is typically from 2 to 4 minutes, more preferably from 2 to 3 minutes, and most preferably from 2.5 to 3 minutes. This work time is preferable for effective mixing of the polyol and isocyanate compositions and degassing of the mixture as discussed in further detail above. Such a work time has been found to be provided by the preferable catalyst mixture discussed above when used in combination with the preferable polyol compositions discussed above. Typically, the heat curable composition is mixed with a mixer at 1500 to 7000 rpm, and more preferably 4000 rpm to 6000 rp, with around 500 rpm being most preferable.

After the work time, the heat curable composition may be introduced to the mold. The process may also comprise a step of cleaning the mold prior to introduction of the liquid composition. For example, the lower surface of the mold may be cleaned. Any suitable cleaning technique may be employed. Preferably, the mold is cleaned by spraying the lower surface of the mold and cavities therein with a cleaning fluid.

The heat curable composition may then be introduced into the mold by pouring said composition into the mold cavities in liquid form. Some of the liquid composition may fall outside of the cavities and onto the lower surface of the mold. A vacuum is then applied to the mold so as to remove any air bubbles that are entrained within the liquid heat curable composition. It has been found by the inventors of the present invention that air bubbles within the liquid heat curable composition negatively affect the physical properties of the cured polyurethane composition and interfere with the curing process. This has not previously been realised. It has been found that the removal of entrained air bubbles results in a polymer with improved impact resistant properties. The application of vacuum to the interior of the mold may cause the liquid polymer located within the mold cavities to bubble as air bubbles or dissolved air are sucked out by the vacuum. Preferably, the vacuum is applied such that the liquid composition is substantially free of air bubbles entrained therein, or air dissolved therein. Most preferably, the vacuum is applied such that the liquid composition is free of air bubbles entrained therein or air dissolved therein. The application of vacuum and formation of bubbles may cause some liquid composition to splash out of the mold cavities and on to the lower surface of the mold. Preferably, this liquid composition is then removed from the mold lower surface by scraping the lower surface of the mold such that substantially all liquid composition in the mold is contained within the cavities within the lower mold surface.

The liquid composition within the mold cavities is heated so as to cure the composition to an extent of from 60% to 95%, in relation to the fully cured composition, so as to form a partially cured composition. Preferably, the heat-curable composition is cured to from 70% to 90% cure, preferably 75% cure to 85% cure, and most preferably to 80% cure, in relation to the fully cured polyurethane composition. Preferably, the heat-curable composition within the mold is heated to a temperature of from 30° C. to 150° C., more preferably 750 to 150° C. and most preferably from 100° C. to 130° C. Preferably, the heat-curable composition within the mold is heated for a time period of from 5 minutes to 10 minutes, preferably from 400 seconds to 550 seconds, and most preferably from 450 seconds to 550 seconds.

The above preferred heating times and temperatures have been found to achieve the desired extent of cure when the more preferable polyol compositions, isocyanate compositions and catalyst packages discussed above are used, in combination with the preferred work times. It will be understood that the above temperatures and times are not essential however, and may vary depending upon the nature of the polyol composition, isocyanate composition, catalysts used, and ratio of polyol composition to isocyanate composition.

A fabric is then applied to the partially cured composition within the mold. Any suitable fabric may be used that is desirable to be worn as a garment, or that can be used as a component of a garment. Preferable fabrics include woven textiles. The fabric used will depend upon the intended use of the impact resistant garment. For example, for garments intended for use in sports, a typical four way stretch lycra may be used. For gloves, a cut resistant material fabric such as high density polyethylene (HDPE) may be used. In other embodiments, the fabric may comprise a non-permeable surface such as a polyurethane surface in the case of polyurethane gloves. In other embodiments, the fabric may comprise other rubber materials such as latexes or nitrile rubber.

The fabric is then pressed together with the partially cured composition such that the partially cured composition joins to the fabric. The partially cured composition and fabric are typically pressed together for a time period of from 5 minutes to 10 minutes, preferably from 400 seconds to 550 seconds, and most preferably from 450 seconds to 550 seconds, although it will be understood that any suitable time can be employed for allowing the fabric to join to the partially cured composition. In some embodiments, during the pressing step, a sheet of soft material such as silicon foam may be applied to the top of the fabric when it the fabric is pressed against the mold cavities. This may help push the fabric into the mold cavities improving the resultant bond between the fabric and the cured polyurethane segments. The partially cured composition is then allowed to fully cure and form a fully cured polyurethane composition with the fabric joined thereto, thereby forming the impact resistant textile-supported garment, or component thereof. The fabric may then be removed from the mold and the cured polymer segments that are joined and adhered to the fabric will also be removed from the mold so as to provide the textile supported garment, or component thereof, with polyurethane segments thereon. In other embodiments, the polyurethane composition and fabric bonded thereto are removed from the mold before the polyurethane composition is fully cured. For example, after formation of the partially cured composition, application of fabric, and pressing of the composition together with the fabric, the composition is allowed to further cure so as to bond to the fabric but is removed from the mold before reaching a 100% fully cured state.

Figure 5:
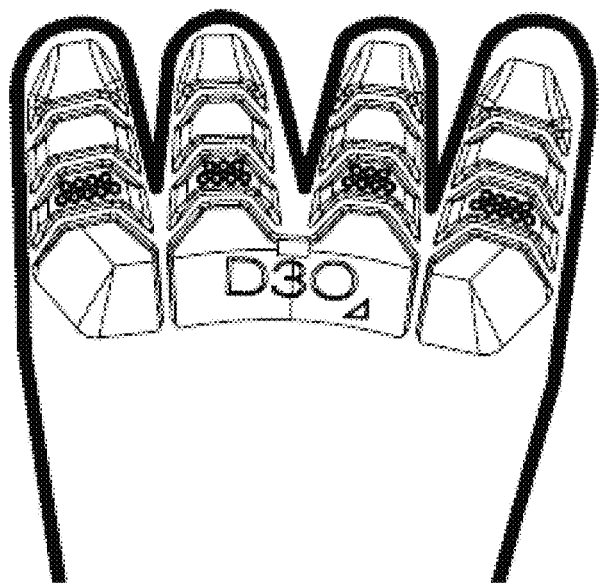
FIG. 5 is an illustration of the inner surface of a glove manufactured using the process of the invention.

The term "joining" as used herein is used to refer to the process of the fabric becoming adhered due to the cured solid polyurethane as a direct result of the polyurethane curing and setting. For example, the fabric may join to the textile by virtue of the partially cured composition migrating to some extent into the small spaces between woven textile fibres before becoming fully cured. In some embodiments, part of the partially cured composition may migrate all the way through the spaces between textile fibres to the outer surface of the textile that is not adjacent to the cured polyurethane segment. Advantageously and unexpectedly, it has been found that using the process of the invention, and in particular when using the preferred polyol compositions, isocyanate compositions, catalyst mixtures, work times, heating conditions, and pressing times discussed above, the partially cured composition migrates through the spaces of the fabric between woven fibres all the way to the outer surface of the fabric, but only around the outer perimeter of each polyurethane segment. It was unexpected that the polyurethane compositions would migrate, cure and join to the fabric in this manner. This phenomenon can be observed in FIG. 5 where the internal surface of a glove according to the invention can be seen. For each separate polyurethane segment, the polyurethane has migrated through the textile to the opposite surface, but only at the perimeter of each segment. Such a manner of joining is aesthetically pleasing and is also believed to result in a more effective join since the joining and bonding of each segment to the fabric is strongest around the perimeter of each. Such a manner of joining also increases the comfort of the wearer of the garment, since less polyurethane is in direct contact with the skin of the wearer. Direct contact between the skin of the wearer and the polyurethane reduces the extent to which moisture (such as sweat) can wick into the fabric.

In preferable embodiments, the impact resistant textile-supported garment is a glove. In said embodiments, the process may comprise a step of forming the fabric into a glove shape, and applying said glove shaped fabric onto a hand shaped mold, and wherein step (iv) of applying the fabric to the partially cured composition comprises applying the hand shaped mold with the glove shaped fabric applied thereon onto the partially cured composition, and pressing together the hand shaped mold with the glove shaped fabric applied thereon and the partially cured composition. In some embodiments, as described above, a compressible layer such as silicon foam is applied to the top of the fabric and hand shaped mold which aids in pushing the fabric into the mold cavities. It will be understood that other equivalent process steps can be employed for making impact resistant garments other than gloves.

Impact Resistant Garments

Any type of impact resistant textile-supported garment may be made using the process of the invention. For example, gloves, or garments such as jackets or trousers. In a highly preferable embodiment, the impact resistant garment is a glove.

The term garment as used herein refers to items of clothing ready for wearing as soon as the process of the invention has been carried out. An example of such a garment would be a glove. In such a case, a fully formed glove may be used as the fabric in the process of the invention such that carrying out the process of the invention results in a wearable garment as the direct product of the process. The term component of a garment is intended to cover sections and components of clothes. For example, the process of the invention could be used to produce an impact resistant textile-supported body pad, that could be considered a component of a garment. The body pad would be a component of a piece of clothing and could be stitched onto a jacket or trousers that can be worn. The process of the invention can thus be used to manufacture garments ready for wearing, or components of garments that may then be stitched onto larger garments to provide an impact resistant garment ready for wearing. The term garment as used herein also refers to impact resistant wearable apparel such as impact resistant knee pads and body pads that may be worn on top of or below conventional clothing. Accordingly, in some embodiments, the impact resistant garment comprises impact resistant wearable apparel such as knee pads or body pads.

Typically, the impact resistant textile-supported garment, or component thereof, comprises at least five non-interconnected impact resistant segments upon an outer surface of the fabric.

Typically, at least five of the non-interconnected impact resistant segments have a depth of at least 4 mm. Preferably, the depth of the at least two segments is at least 5 mm, 6 mm, 7 mm, 8 mm, 9 mm or 10 mm.

Typically, the depth of at least five non-interconnected impact resistant segments is at least 5 mm, 6 mm, 7 mm, 8 mm, 9 mm or 10 mm. Preferably, each of the five segments have dimensions smaller than 1.75 cm×1 cm×1 cm.

Where the impact resistant textile-supported garment, or component thereof, is a glove, the glove preferably passes an EN388 impact resistance test, which is a standard test known in the art for assessing whether or not a garment is suitably impact resistant. The EN388 test is typically considered passed if the glove transmits an average peak force of less than 7 kN. Accordingly, in preferred embodiments, the impact resistant garment is a glove and transmits an average peak force of less than 7 kN. In other embodiments, the glove may pass an ISEA 138 test at level 1, level 2 or level 3. Level 1 is passed if the glove transmits an average peak force of less than 9 kN, level 2 is passed if the glove transmits an average peak force of less than 6.5 kN, and level 3 is passed if the glove transmits an average peak force of less than 4 kN.

In other embodiments, the impact resistant textile-supported garment is a motorcycle limb protector such as an arm protector or a leg protector. In such embodiments, typically, the impact resistant textile-supported garment, or component thereof, has an average peak transmitted force of less than 25 kN when dry, and/or has an average peak transmitted force of less than 30 kN when wet. Alternatively, where the impact resistant textile-supported garment is a motorcycle limb protector such as an arm protector or leg protector, the garment may pass an EN1621-1 test at level 1 or level 2. Level 1 is typical considered passed if the garment transmits an average peak force of less than 35 kN. Level 2 is typically passed if the garment transmits an average peak force of less than 20 kN.

Where the impact resistant garment is a glove comprising the fabric, in preferable embodiments, the glove comprises a main cavity for receiving a hand therein, interconnected to a plurality of smaller cavities for receiving each finger and the thumb of the hand; wherein the fabric defines an inner surface of the glove; and wherein each section of the fabric that defines each smaller cavity for receiving each finger and thumb of the hand, typically comprises at least two non-interconnected impact resistant polyurethane segments upon the outer surface thereof, wherein the at least two non-interconnected impact resistant polyurethane segments have dimensions smaller than 1.75 cm×1 cm×1 cm. In highly preferable embodiments, the at least two non-interconnected polyurethane segments have a depth of at least 5 mm. In further preferable embodiments each finger receiving cavity of the glove comprises at least 5 non-interconnected polyurethane segments upon the outer surface of the glove. An example of such a glove may be seen in FIG. 6. It can be seen that each polyurethane segment is non-interconnected to the other polyurethane segments on the glove. However, the polyurethane segments, taken together, still provide an outer surface of the glove that is substantially impact resistant. Despite being substantially comprised of non-interconnected segments, a substantially large surface area of the glove is still covered with impact resistant material. Due to the non-interconnectedness of the segments upon the outer surface of the glove, a wearer of the glove will have sufficient flexibility for finger movement since movement and bending of the fingers will not be resisted by polyurethane segments being bent. This is in stark contrast to prior known gloves such as those shown in FIG. 2, where each glove cavity for receiving a finger comprises only one single polyurethane segment upon the finger thereof.

The glove shown in FIG. 6 has further been found to pass tests known in the art for assessing the suitability of an impact resistant glove. This test is ISEA 138.

FIG. 6 shows a glove according to another embodiment of the present invention. It can be seen that the glove comprises a plurality of non-interconnected segments joined the surface of a fabric layer. An advantage of this embodiment is that complete back of hand impact resistant protection is provided by the glove. Despite the entirety of the back of hand being covered by impact resistant material, advantageously, the glove maintains flexibility for the wearer due to the non-interconnected segments.

It will be understood that the profile depth of each segment, number of segments and respective geometries of each segment may be adapted and optimised for specific impact resistant garments, or components thereof. The inventors of the present invention have found that the preferable depths, profiles and number of segments discussed above, and shown in the Figures, are highly preferable, particularly where the impact resistant garment is a glove.

Figure 1:
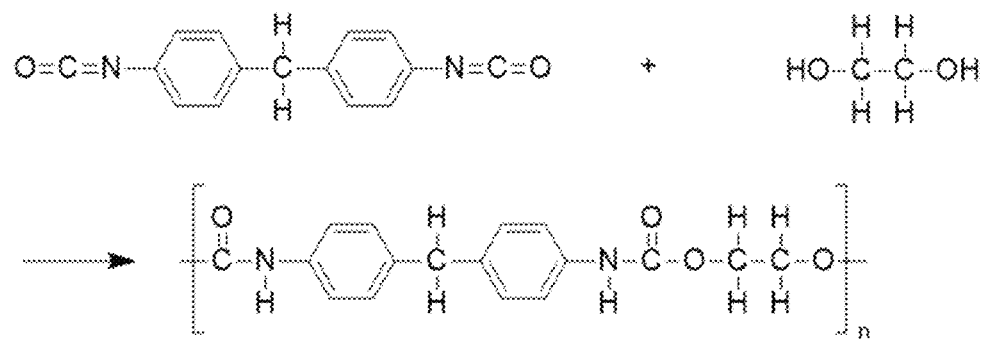
FIG. 1 is a diagram showing the typical reaction of a diisocyanate with a polyol to form a polyurethane.
Figure 2:
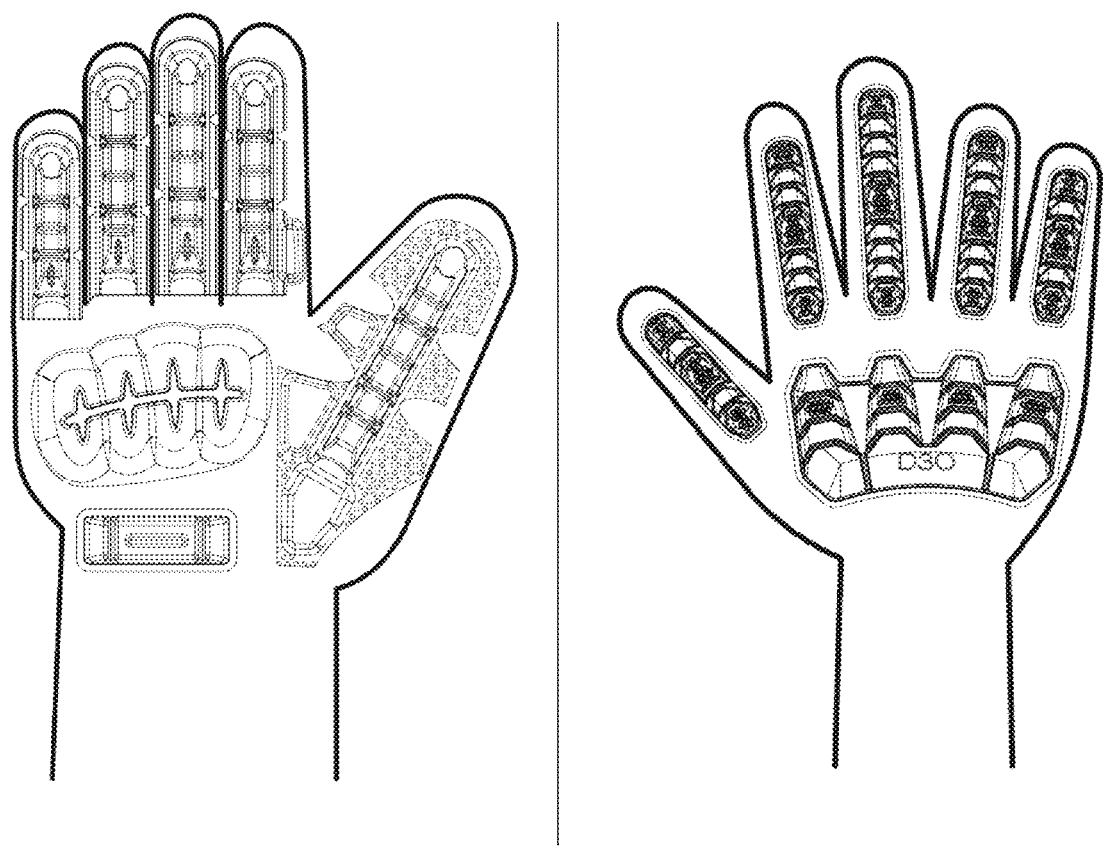
FIG. 2 is an illustration of two impact resistant gloves of the prior art.

An additional advantage of gloves and other impact resistant garments manufactured using the process of the invention is that said garments have increased breathability compared to garments known in the art such as those shown in FIG. 2. In the garments shown in FIG. 2, the large polyurethane segments cover large areas of the surface preventing breathability of the underlying fragment and skin. In contrast, the non-interconnectedness of garments of the invention mean that there is more exposed fabric present, increasing the breathability of the garments.

Example 1

The process of the invention was carried out using a polyol composition comprising the ingredients as shown in Table 1 below.

TABLE 1

| Chemical | Weight % |
|---|---|
| Voranol 2120 | 75-85 |
| Dipropylene glycol | 5 to 10 |
| 1,4-butane diol | 2.5 to 7.5 |
| Pigment 55252 | 0.5 to 10.5 |
| Sylosiv A3 | 2.5 to 3.5 |
| Byk 066N | 0.5 to 1 |
| Byk 088 | 0.5 to 1 |
| Bicat Z | 0.02 to 0.08 |
| Bicat 8108 | 0.01 to 0.02 |
| POLYCAT SA8 | 0.075 to 0.1 |
| Dilatant | 2 to 4 |

The dilatant is a blend of a diol with a molecular weight of around 400 and silica.

Information regarding the other components of the polyol composition is given above.

The isocyanate composition used in the reaction was Suprasec 2010, details of which are given above.

The polyol composition and isocyanate composition were reacted in a ratio of 100:53 by weight.

The work time of the process during which the polyol composition and isocyanate composition were mixed and stirred without heating was approximately 170 seconds. This was followed by a heating time of approximately 460 seconds during which time the composition was cured so as to form a polyurethane by heating said composition within a mold to around 40° C. to 50° C. After partial curing in the oven, the partially cured composition was pressed onto fabric for a time of around 400 seconds so as to join to the fabric.

Example 2

Figure 7:
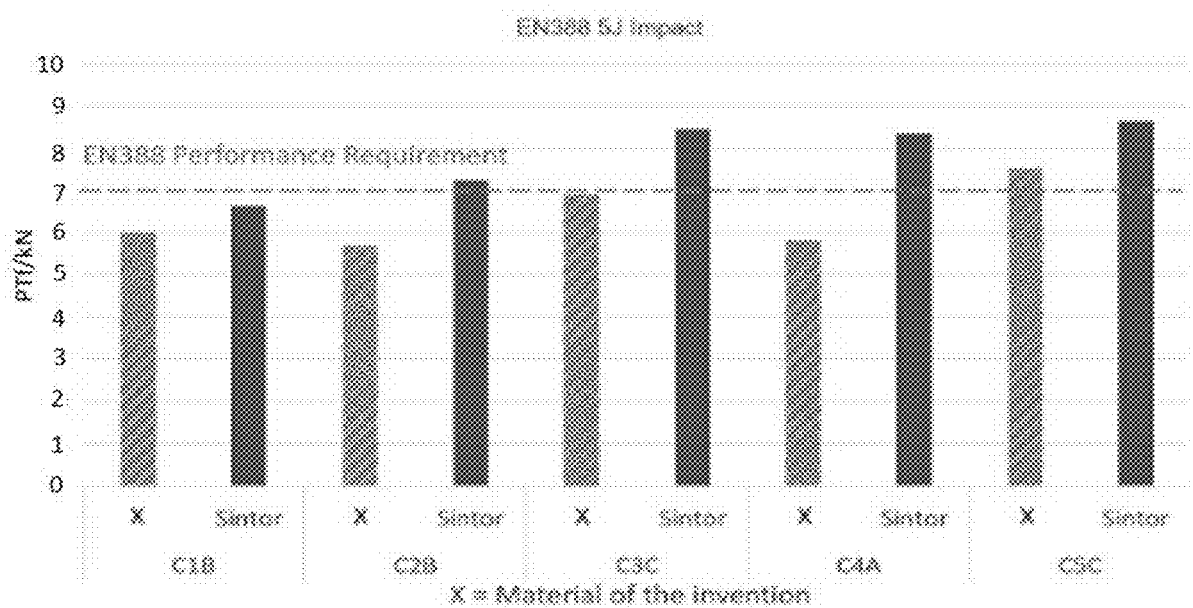
FIG. 7 is a graph comparing the performance of a garment manufactured according to the process of the invention with known impact resistant materials, in a standard test known in the art for impact resistance.

Various polyurethane segments joined to fabric were manufactured using the process of the invention. Said segments had various different geometries. Each segment was compared to a competitor impact resistant material segment of the same geometry. The competitor comparison material is known in the art as Sintor. Sintor is an elastomer material similar to materials of the present disclosure, but not made by the process of the invention. The comparison was made using an EN388 Mechanical glove standard test. In such a test, a segment was considered to have the test if it transmitted less than 7 kN of force on impact. The results of the test are shown in FIG. 7. The geometries C1B, C2B, C3C, C4A and C5C were tested. It can be seen that in all cases, the comparative Sintor material transmitted more force than the material manufactured using the process of the invention. It can also be seen that the transmitted force for segments made using the process of the invention was under 7 kN for all geometries, with the exception of geometry C5C. It can be concluded from these tests that the material manufactured using the process of the invention was better than the Sintor material for all geometries.

Example 3

Figure 8:
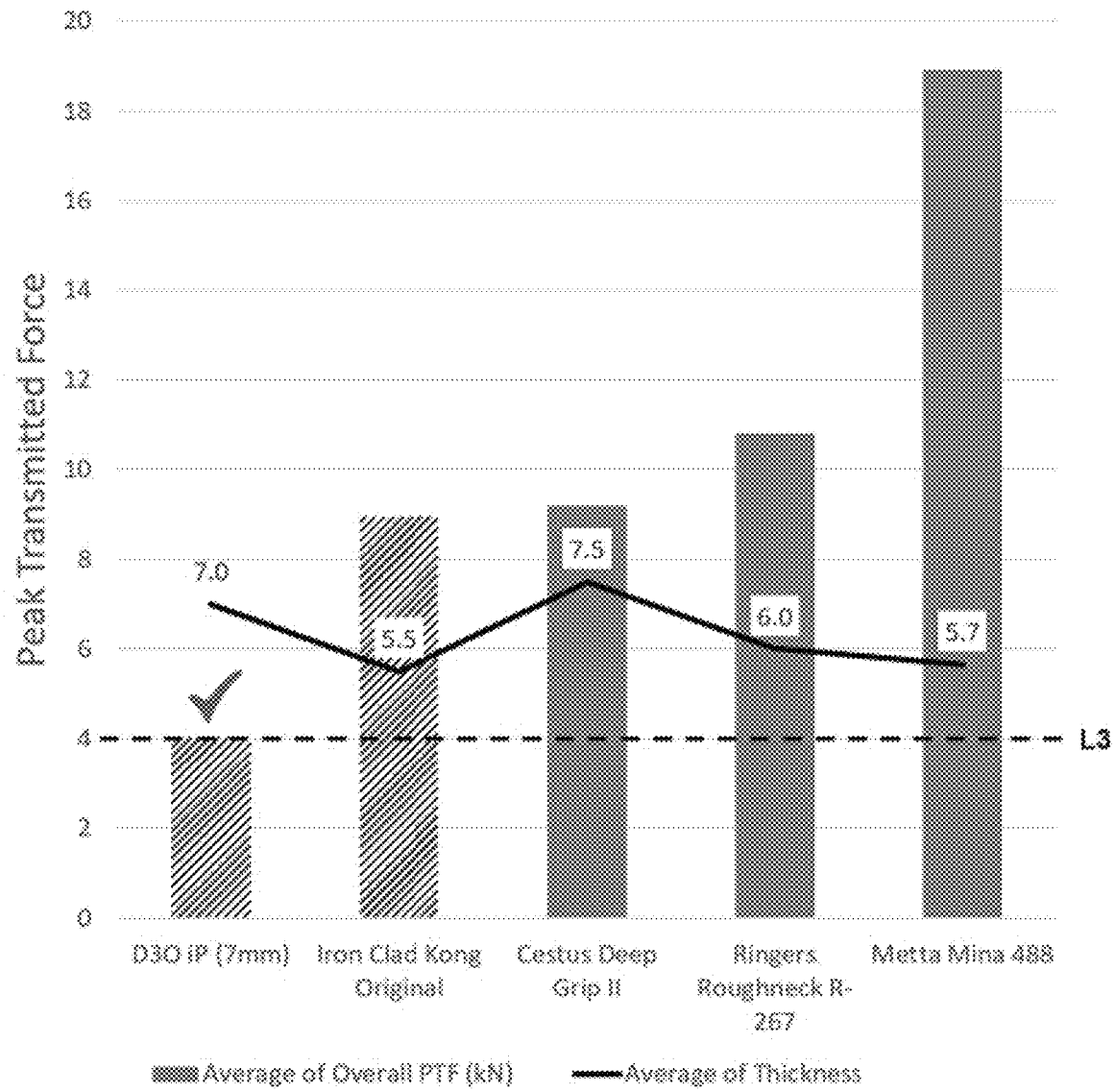
FIG. 8 is a graph comparing the performance of a garment manufactured according to the process of the invention with known impact resistant materials, in a standard test known in the art for impact resistance.
Figure 9:
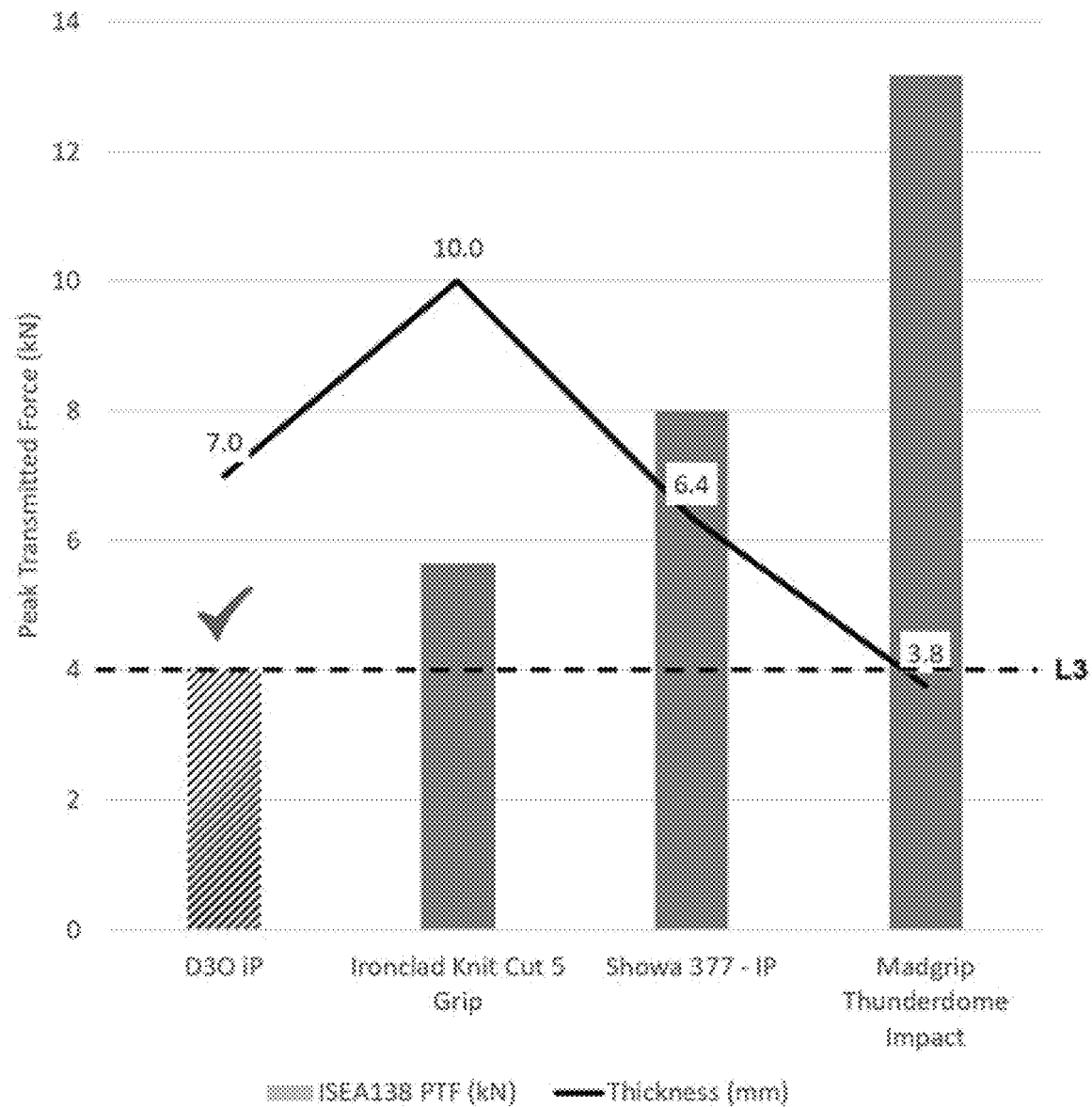
FIG. 9 is a graph comparing the performance of a garment manufactured according to the process of the invention with known impact resistant materials, in a standard test known in the art for impact resistance.

In another series of tests, impact resistant gloves manufactured using the process of the invention were found to pass level 3 of the ANSI/ISEA 138 standard with less than a 7 mm profile depth for back of hand impact resistant protection. A comparison of the material manufactured using the process of the invention (D3O iP) to other impact resistant materials known in the art is shown in FIGS. 8 and 9.

The invention claimed is:

1. A process of manufacturing an impact resistant textile-supported garment, or a component thereof, wherein the process comprises the following steps:
   (i) providing a heat-curable composition configured to form a polyurethane upon heat curing;
   (ii) providing a mold comprising two opposing surfaces, wherein the mold comprises at least one mold cavity with a depth of at least 3 mm in at least one of the two opposing surfaces;
   (iii) introducing the heat-curable composition into the at least one mold cavity;
   (iv) applying a vacuum to an interior of the mold such that the interior of the mold is substantially free of air;
   (v) heating the heat-curable composition within the mold such that the composition cures to an extent of from 60% to 95%, in relation to the fully cured composition, so as to form a partially cured composition;
   (vi) applying a fabric to the partially cured composition;
   (vii) pressing the fabric and partially cured composition together such that the partially cured composition joins to the fabric; and
   (viii) allowing the partially cured composition to fully cure and form a fully cured polyurethane composition with the fabric joined thereto, thereby forming the impact resistant textile-supported garment, or component thereof, wherein the impact resistant textile-supported garment, or component thereof, comprises at least one impact resistant segment with a depth of at least 3 mm upon a surface of the fabric.

2. A process according to claim 1, wherein the impact resistant textile-supported garment is a glove.

3. A process according to claim 1, wherein step (v) comprises heating the heat-curable composition to from 70% to 90% cure.

4. A process according to claim 1, wherein the heat-curable composition comprises a polyol composition and an isocyanate composition.

5. A process according to claim 4, wherein the polyol composition comprises:
   (i) from 70 wt % to 90 wt % of one or more (polyether) polyols with a molecular weight of from 1800 to 5000;
   (ii) from 2.5 wt % to 15 wt % of dipropylene glycol; and
   (iii) from 2.5 wt % to 10 wt % of 1,4-butane diol.

6. A process according to claim 4, wherein the polyol composition further comprises from 0.5 wt % to 2.5 wt % of a pigment.

7. A process according to claim 4, wherein the polyol composition further comprises one or more degassing agents.

8. A process according to claim 4, wherein the polyol composition further comprises one or more dilatants.

9. A process according claim 4, wherein the polyol composition further comprises one or more catalysts.

10. A process according to claim 9, wherein the one or more catalysts comprise (i) zinc neodecanoate, bismuth neodecanoate and 1, 8-Diazabicyclo[5.4.0]undec-7-ene, or (ii) wherein the one or more catalysts comprise 1, 8-Diazabicyclo[5.4.0]undec-7-ene and 1, 4-diazabicyclo [2.2.2] octane.

11. A process according claim 4, wherein the isocyanate composition comprises a methylene diphenyl diisocyanate (MDI).

12. A process according to claim 4, wherein the polyol composition and isocyanate composition are contacted so as to form the heat-curable composition prior to introduction of the heat-curable composition into the mold and/or wherein the process further comprises a step of degassing the heat-curable composition, isocyanate composition, polyol composition, or any combination thereof, by applying vacuum prior to introduction into the mold, such that said compositions are substantially free of air.

13. A process according to claim 4, wherein the polyol composition and isocyanate composition are contacted so as to form the heat-curable composition prior to introduction of the heat-curable composition into the mold, and wherein the process further comprises mixing the heat-curable composition prior to step (iii) of introducing the heat-curable composition into the mold.

14. A process according to claim 1, wherein prior to step (iii) of introducing the heat-curable composition to the mold, the heat-curable composition is mixed for a time period from 2 to 4 minutes, and/or wherein step (v) of heating the heat-curable composition within the mold comprises heating the heat-curable composition to a temperature of from 30° C. to 150° C., and/or wherein step (v) of heating the heat-curable composition within the mold comprises heating the heat-curable composition for a time period of from 5 minutes to 10 minutes, and/or wherein the partially cured composition and fabric are pressed together for a time period of from 300 seconds to 800 seconds.

15. A process according to claim 1, further comprising a step of removing the impact resistant textile-supported garment, or component thereof, from the mold.

16. A process according to claim 1, wherein the mold is not an injection mold, and the process does not comprise injection molding.

17. A process according to claim 1, wherein the mold comprises at least three discrete non-interconnected mold cavities.

18. A process according to claim 1, wherein the impact resistant textile-supported garment, or component thereof, comprises at least five non-inter connected impact resistant segments upon an outer surface of the fabric.

19. A process according to claim 18, wherein at least five of the non-interconnected mold cavities have a depth of at least 4 mm.

20. A process according to claim 1, wherein the mold comprises at least one mold cavity, wherein the at least one cavity has a depth of at least 3 mm at its deepest part, and wherein the at least one cavity comprises one or more regions shaped as a perimeter ditch surrounding an area of a surface of the mold, wherein the impact resistant textile-supported garment comprises at least one impact resistant polyurethane segment, wherein the at least one segment has a depth of at least 3 mm at its deepest part, and wherein the at least one segment is a hollow segment, comprising one or more regions defined by an outer polyurethane perimeter, surrounding a region of fabric that is not covered by polyurethane and/or wherein the mold comprises at least two non-interconnected cavities having a depth of at least 3 mm at their deepest part, the cavities each comprising one or more regions shaped as a perimeter ditch surrounding an area of a surface of the mold, and/or wherein the impact resistant textile-supported garment comprises at least two non-interconnected impact resistant polyurethane segments, the segments each having a depth of at least 3 mm at their deepest part, and wherein the segments are hollow segments, each hollow segment comprising one or more regions defined by an outer polyurethane perimeter, surrounding a region of fabric that is not covered by polyurethane.

21. A process according to claim 1, wherein the process further comprises a step of cleaning the mold prior to step (iii) of introducing the heat curable composition to the mold.

22. A process according to claim 1, wherein the impact resistant textile-supported garment is a glove and passes an EN388 impact resistance test, or, wherein the glove passes an ISEA 138 test at level 1, level 2 or level 3.

23. A process according to claim 1, wherein the impact resistant textile-supported garment is a glove comprising the fabric, wherein the glove comprises a main cavity for receiving a hand therein, interconnected to a plurality of smaller cavities for receiving each finger and the thumb of the hand; wherein the fabric defines an inner surface of the glove; and wherein each section of the fabric that defines each smaller cavity for receiving each finger and thumb of the hand, comprises at least two non-interconnected impact resistant polyurethane segments upon the outer surface thereof, wherein the at least two non-interconnected impact resistant polyurethane segments have dimensions smaller than 1.75 cm×1 cm×1 cm.

24. A process according to claim 1, wherein the impact resistant textile-supported garment is a glove, and wherein the process further comprises a step of forming the fabric into a glove shape, and applying said glove shaped fabric onto a hand shaped mold, and wherein step (iv) of applying the fabric to the partially cured composition comprises applying the hand shaped mold with the glove shaped fabric applied thereon onto the partially cured composition, and pressing together the hand shaped mold with the glove shaped fabric applied thereon and the partially cured composition.

* * * * *